United States Patent [19]
Ohno et al.

[11] Patent Number: 5,150,143
[45] Date of Patent: Sep. 22, 1992

[54] TRIMMING INFORMATION RECORDABLE CAMERA

[75] Inventors: Yoshimi Ohno, Kawasaki; Junichi Shinohara, Yokohama, both of Japan

[73] Assignee: Ricoh Company, Ltd., Tokyo, Japan

[21] Appl. No.: 688,261

[22] Filed: Apr. 22, 1991

[30] Foreign Application Priority Data

| May 1, 1990 | [JP] | Japan | 2-111763 |
| May 10, 1990 | [JP] | Japan | 2-118603 |
| May 10, 1990 | [JP] | Japan | 2-118604 |
| Jan. 29, 1991 | [JP] | Japan | 3-8989 |

[51] Int. Cl.$^5$ ............ G03B 5/00; G03B 13/12; G03B 13/36; G03B 17/24
[52] U.S. Cl. ............ 354/400; 354/106; 354/199; 354/222
[58] Field of Search ............ 354/400, 402, 106, 195.1, 354/195.12, 199, 200, 201, 222

[56] References Cited

U.S. PATENT DOCUMENTS 4,780,735 10/1988 Taniguchi et al. .................. 354/202

FOREIGN PATENT DOCUMENTS

| 57-89732 | 6/1982 | Japan . |
| 61-43698 | 9/1986 | Japan . |
| 62-50737 | 3/1987 | Japan . |
| 62-50743 | 3/1987 | Japan . |
| 62-50748 | 3/1987 | Japan . |
| 62-52541 | 3/1987 | Japan . |
| 63-10140 | 1/1988 | Japan . |
| 9004214 | 4/1990 | PCT Int'l Appl. . |

*Primary Examiner*—W. B. Perkey
*Attorney, Agent, or Firm*—Oblon, Spivak, McClelland, Maier & Neustadt

[57] ABSTRACT

A trimming information recordable camera which is usable in cooperation with a labo-system in which a film is printed according to the trimming information written in the film when loaded in the camera. The camera comprises: a photographing lens having a plurality of focal lengths and capable of selecting one of the focal lengths; a zoom finder through which a view field angle can be changed; and a system for writing a trimming data in the film. The film is printed in accordance with the trimming data which is obtained from a data of the view field angle of the zoom finder and a data of a view field angle of the photographing lens.

11 Claims, 19 Drawing Sheets

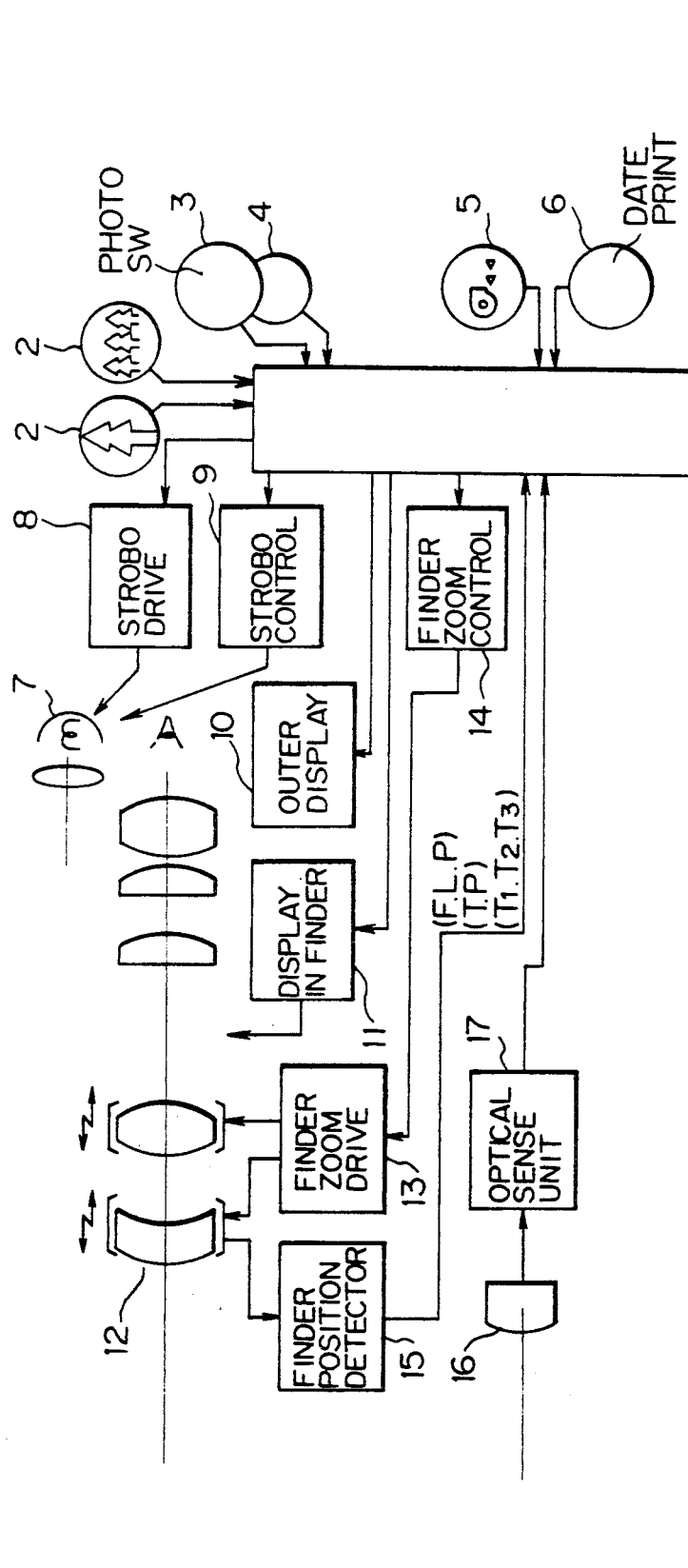

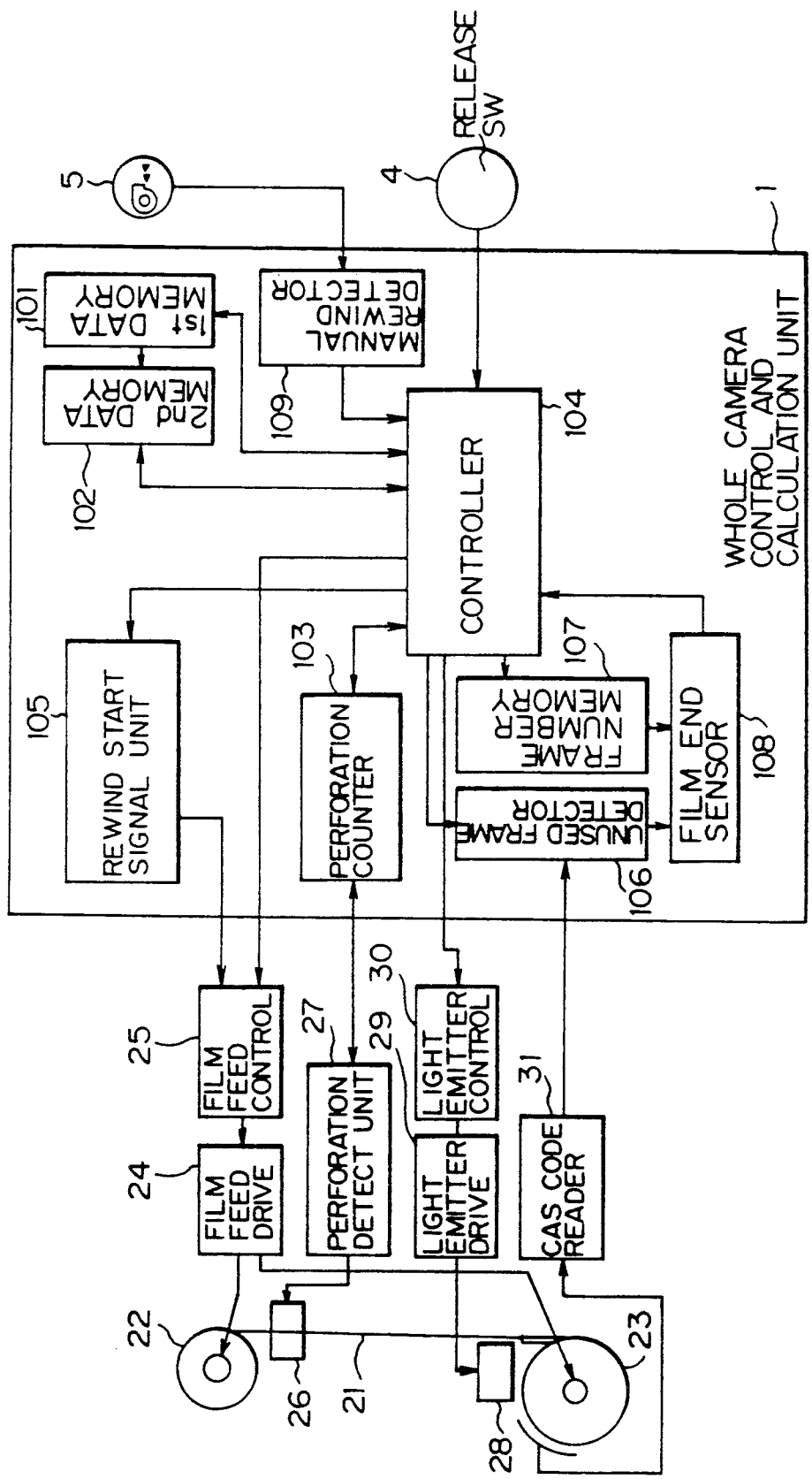

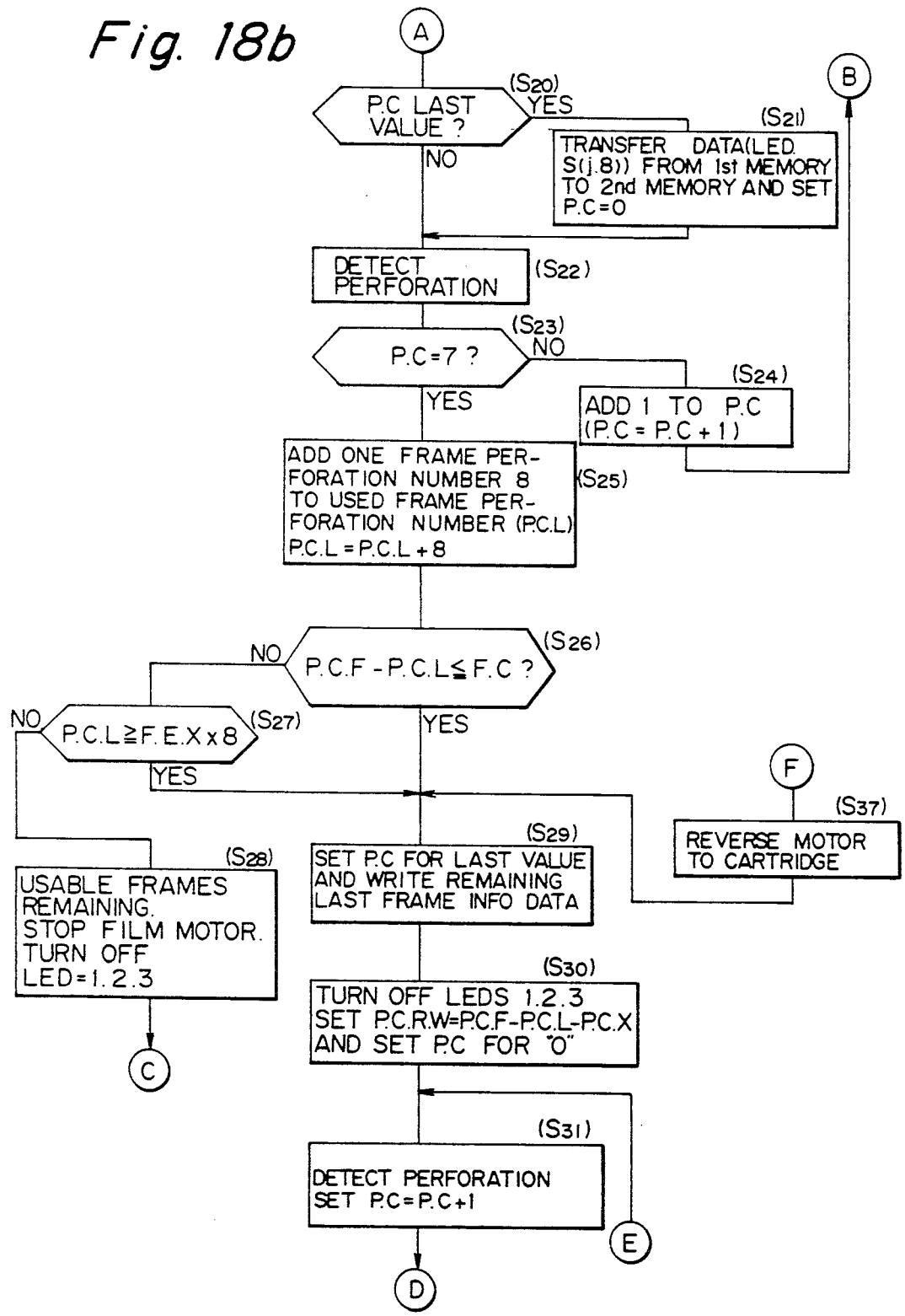

TRIMMING INFORMATION RECORDABLE CAMERA

BACKGROUND OF THE INVENTION

1. Field of the Invention

The present invention relates to a trimming information recordable camera which makes it possible to record information on the film for trimming the composition of photographed scene or deciding the field angle at the time of printing the film on a photographic paper.

2. Description of the Related Art

It is important to decide composition or field angle of the photograph. Today, various types of camera equipped with zoom lens installed therein have been developed which makes it possible to easily change the composition of photographing object or scene by changing the field angle of the lens.

There are two ways for changing the field angle (composition). One is to change the focal length of the lens so as to change the photographing object itself imaged on the film at the time of taking the scene. The other way to change the composition is to trimming the image formed in the film at the time of printing the film on the photographing paper.

To decide the composition of the photograph by trimming the image in the film at the time of printing, the trimming information is recorded in the film so that the information is read at the time of printing the film in the labo-system to trim the film. Such a trimming information recordable camera is disclosed in Japanese Patent Application Laying Open (KOKAI) No. 62-50743, for example.

Suppose that the image of the film is to be enlarged to twice at the time of printing the film, the possible combination of the photographing lens and the finder magnification is represented in the table-1 as follows.

TABLE 1

|  |  | FINDER | | |
|---|---|---|---|---|
|  |  | f = 35, f = 70 TWO FOCAL POINTS | f = 35 to 70 ZOOM or STEP | f = 35 to 105 or 135 ZOOM or STEP |
| PHOTO. LENS | f = 35 | ① | ③ | ⑤ |
|  | f = 35 f = 70 TWO FOC. PNT. | ② | ④ | ⑥ |

Advantageous combinations in the table-1 are ①, ③ and ⑥. The combination ① represents a two-focal point camera including a labo-system. The combination ③ represents a twice magnification zooming camera including a labo-system. Also, the combination ⑥ represents a three to four-time magnification zooming camera including a labo-system.

The most sophisticated function is obtained from the combination ⑥ of the table. On the assumption that the trimming information is represented by three bits ($T_1$, $T_2$, and $T_3$), for example, the following table-2 can be obtained.

TABLE 2

| PHOTO LENS | FINDER f | TRIM. INFO. | | | PRINT MAG-NIFY | F.L.P. | P. NO. |
|---|---|---|---|---|---|---|---|
|  |  | $T_1$ | $T_2$ | $T_3$ |  |  |  |
| f = 35 | 35 | 0 | 0 | 0 | 1 | 0 | 1 |
|  | 39 | 0 | 0 | 1 | 1.125 | 0 | 2 |
|  | 43 | 0 | 1 | 0 | 1.25 | 0 | 3 |
|  | 48 | 0 | 1 | 1 | 1.375 | 0 | 4 |
|  | 52 | 1 | 0 | 0 | 1.5 | 0 | 5 |
|  | 56 | 1 | 0 | 1 | 1.625 | 0 | 6 |
|  | 61 | 1 | 1 | 0 | 1.75 | 0 | 7 |
|  | 65 | 1 | 1 | 1 | 1.875 | 0 | 8 |
| f = 70 | 70 | 0 | 0 | 0 | 1 | 1 | 9 |
|  | 78 | 0 | 0 | 1 | 1.125 | 1 | 10 |
|  | 87 | 0 | 1 | 0 | 1.25 | 1 | 11 |
|  | 96 | 0 | 1 | 1 | 1.375 | 1 | 12 |
|  | 105 | 1 | 0 | 0 | 1.5 | 1 | 13 |
|  | 113 | 1 | 0 | 1 | 1.625 | 1 | 14 |
|  | 122 | 1 | 1 | 0 | 1.75 | 1 | 15 |
|  | 131 | 1 | 1 | 1 | 1.875 | 1 | 16 |

Note:
"FINDER f" is focal length of finder view field corresponding to photographing lens;
"PRINT MAGNIFY" is correction of magnification at time of printing film;
"F.L.P." is focus lens position that represents whether the photographing lens position is at f = 35 or f = 70. F.L.P. signal "0" represents the state of f = 35 while signal "1" represents the state of f = 70; and
"P. No." is position number.

The related art mentioned above has problems as follows.

(1) First, with regard to the system ⑥ of table-1, the finder view field changes according to the steps of table-2. However, actually, the scene is not seen well through the finder which has a view field changing according to table-2. Also, from the standpoint of mechanical structure, in the case where an optical system of the finder is to be assembled comprising cam means, it is more advantageous when the view field change is continuous than when the change is stepping from the view points of the transmission efficiency of the driving force (pressure angle) and the space for the system.

(2) Secondly, the focal point of the photographing lens is changed between the two points of f=35 and f=70 by putting a group of three lenses on the optical axis of the photographing lens or taking the lenses out of the optical axis. Therefore, it takes a certain time for arranging the lenses on or out of the optical axis, which results in that it requires more time to move from the position 8 to the position 9 or vice versa than to move between the other positions in the table-2. This means, in the developing process, the finder view field change is temporarily stopped at the time of moving from the position 8 to the position 9 or vice versa, which degrades the appearance of the print.

Besides, in the labo-system, since it is difficult to continuously change the view field from the aspect of processing time, the trimming process is carried out step by step, which involves in a problem that it becomes necessary to match the timing of each process with each step.

The trimming information recordable camera mentioned above may comprise a writing means for writing information data such as date in the film.

The data is written at a corner of each frame of the film in the form of letters of numerals so that the user can confirm the data. However, in accordance with such a way of writing data, it becomes difficult to read the data depending on the luminance of the object to be taken at the position on the film where the data is to be written. Also, a part of the object in the frame is obscured by the information data.

Also, with regard to the trimming information recordable camera, there is a problem that the data written in a portion to be trimmed off is cut away and not printed. Japanese Patent Application Laying Open (KOKAI) No. 62-50743 discloses a proposal for solving the problem by generating code signals corresponding to the data to be written in the film and writing the code signals in the film at a portion out of the frame where the scene is photographed.

As described in the patent document 62-50743, the data such as the date of photographing written at a portion out of the frame of the film is read by a line sensor, for example, at the time of printing process. When the code signal indicates to print the date, the date is printed at a right end (seen from the back side of the film) in the frame. The code is constituted from 17 bits.

However, in accordance with the camera having the data writing function as disclosed in the Japanese patent document 62-50743, the following problems arise.

① First, there is a possibility of destroying the data when cutting the film at the time of editing the film after development thereof, the data code being printed at the right end of the frame seen from the back side of the film.

② Second, it becomes necessary to prepare one light emitting diode (LED) for each bit of the code signal, which rises the cost of the arrangement and necessitates a relatively large space for wiring the arrangement, thus hampering the realization of compact structure.

③ Thirdly, the LEDs for writing the data are disposed right aside the aperture of the camera body, which causes to generate flare and lowers the contrast of the image.

④ Fourthly, to avoid reading errors of the data at the time of printing process, the writing LEDs have to be accurately arranged at predetermined positions.

SUMMARY OF THE INVENTION

The present invention was made to obviate the above-mentioned problems of the related art. It is therefore an object of the present invention to provide a trimming information recordable camera which makes it possible to intermittently stop the view field angle change of the finder at positions corresponding to respective trimming step positions in the labo-system and change the finder view field at a constant speed.

It is a further object of the present invention to realize a generally convenient and advantageous camera which attenuates the above-mentioned problems concerning the function of writing data in the film.

The above-mentioned object of the present invention can be achieved by a trimming information recordable camera which is usable in cooperation with a labo-system in which a film is printed according to the trimming information written in the film when loaded in the camera, the camera comprising:

a photographing lens having a plurality of focal lengths and being capable of selecting one of the focal lengths;

a zoom finder through which a view field angle can be continuously changed; and a writing means for writing said trimming information in the film, the film being able to be printed in accordance with the trimming information which is obtained from a information of the view field angle of the zoom finder and a information of a view field angle of the photographing lens.

Advantages of the above-mentioned trimming information recordable camera in accordance with the present invention are as follows.

(1) It becomes possible to realize a light and compact camera by which can be obtained photos of desired field angle. The reason for this is as follows. When a zoom lens is used, the larger the zooming magnification becomes, the bulkier the lens and the camera body accordingly becomes, in general. However, in accordance with the present invention, the field angle is decided by the user observing through the finder and changing the finder view field angle while the focal length of the photographing lens is being fixed. The finder field angle data is recorded on the film as trimming information which is written in the film between perforations thereof. The film is trimmed according to the written information data in the labo-system at the time of printing process. Therefore, a photo of desired field angle can be obtained without using a zoom lens which makes the camera bulky.

(2) Trimming point signals are arranged so that the finder zoom motor is kept actuated until the finder zoom position comes to a trimming point even when the zooming butten is released in the middle of the finder zooming motion at a position between the trimming points. That is, while the finder view field angle is basically changed continuously, it becomes possible to stop the finder zooming motion accurately at respective positions corresponding to the trimming points. Therefore, the functionability of the finder becomes upgraded so that the scene can be well seen through the finder and that the optical system of the finder becomes compact, which raises the transmission efficiency of driving force of the optical system and reduces the space for the optical system arrangement.

(3) When the focal length of the photographing lens is to be changed, the lens is changed after the finder zooming motion by manipulation of the zoom button is finished and after determining whether it is necessary to change the lens or not. Therefore, the finder field changing motion is not influenced by the change of the photographing lens focal length so that it becomes possible to continuously change the finder field angle at a constant speed without being stopped at the time when the lens is changed, which upgrades the observability of scene through the finder so that the user can well view the scene comfortably through the finder.

(4) The motor for driving the optical lens is controlled in such a manner that after manipulation of the zooming button is ended, the length to the object is measured in response to the manipulation of the luminous sensor switch, after that, whether it is necessary to change the photographing lens or not is determined and that the moving amount of the lens is calculated on the basis of the data of the length to the object and information data whether it is necessary or not to change the lens focal length. Therefore, the changing motion of the finder field angle is not influenced by the changing motion of the lens, which makes it possible to continuously change the finder field angle at a constant speed without being at the time when the lens is changed so that the user can well view the scene comfortably through the finder.

Further objects and advantages of the present invention will be apparent from the following description of the preferred embodiments of the invention as illustrated in the accompanying drawings.

BRIEF DESCRIPTION OF THE DRAWINGS

FIG. 1 comprising FIGS. 1a, 1b, and 1c is a constructional view of the whole arrangement of the trimming information recordable camera in accordance with the present invention in which various information including trimming information are written in the film charged in the camera and the film is printed on the basis of the trimming information data read from the film in the labo-system;

FIG. 14 is a constructional view of a main portion of the camera of FIG. 13;

FIGS. 18a to 18c are flow charts of the embodiment of FIG. 17.

DESCRIPTION OF THE PREFERRED EMBODIMENTS

Figure 1B:
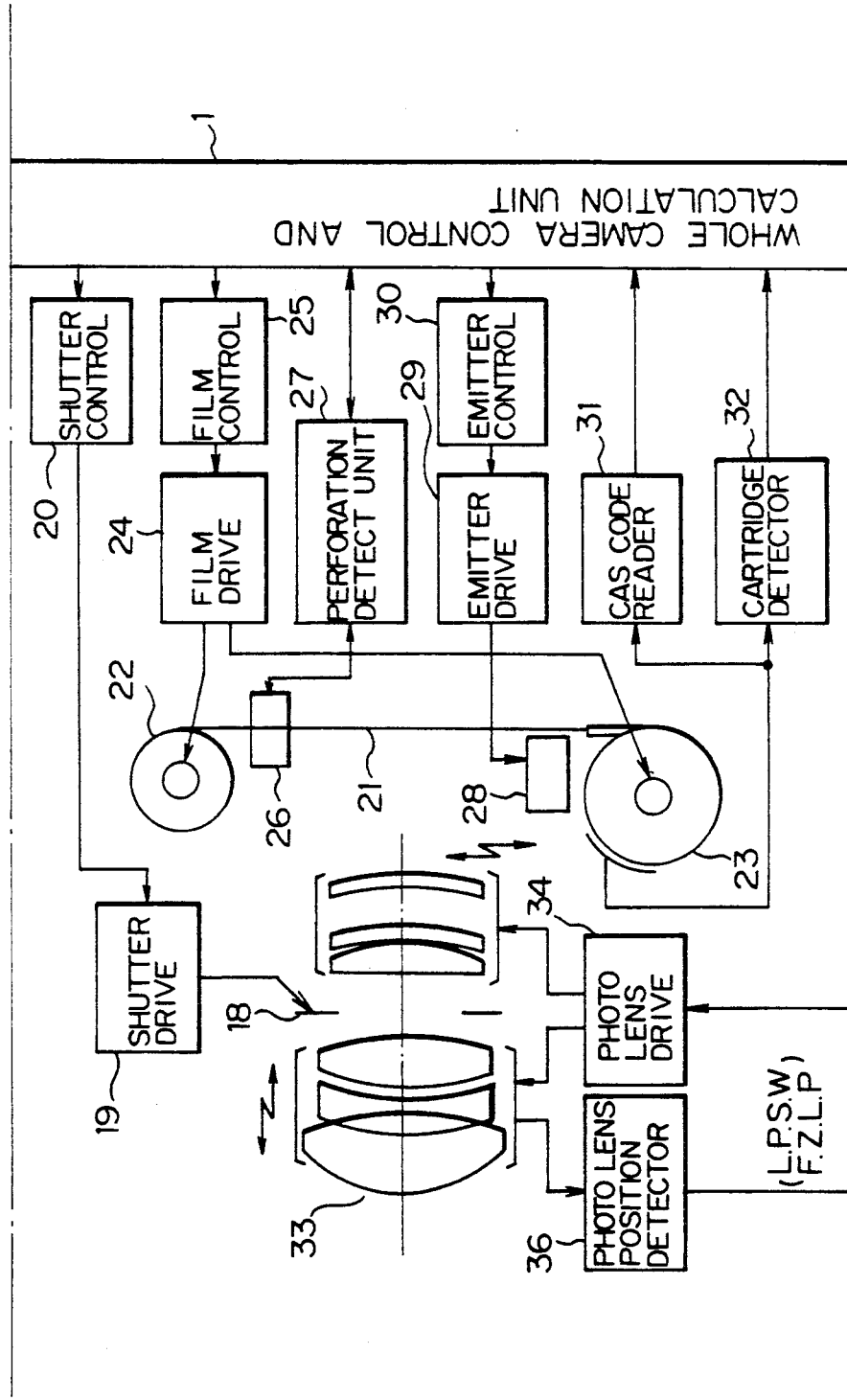
Figure 1C:
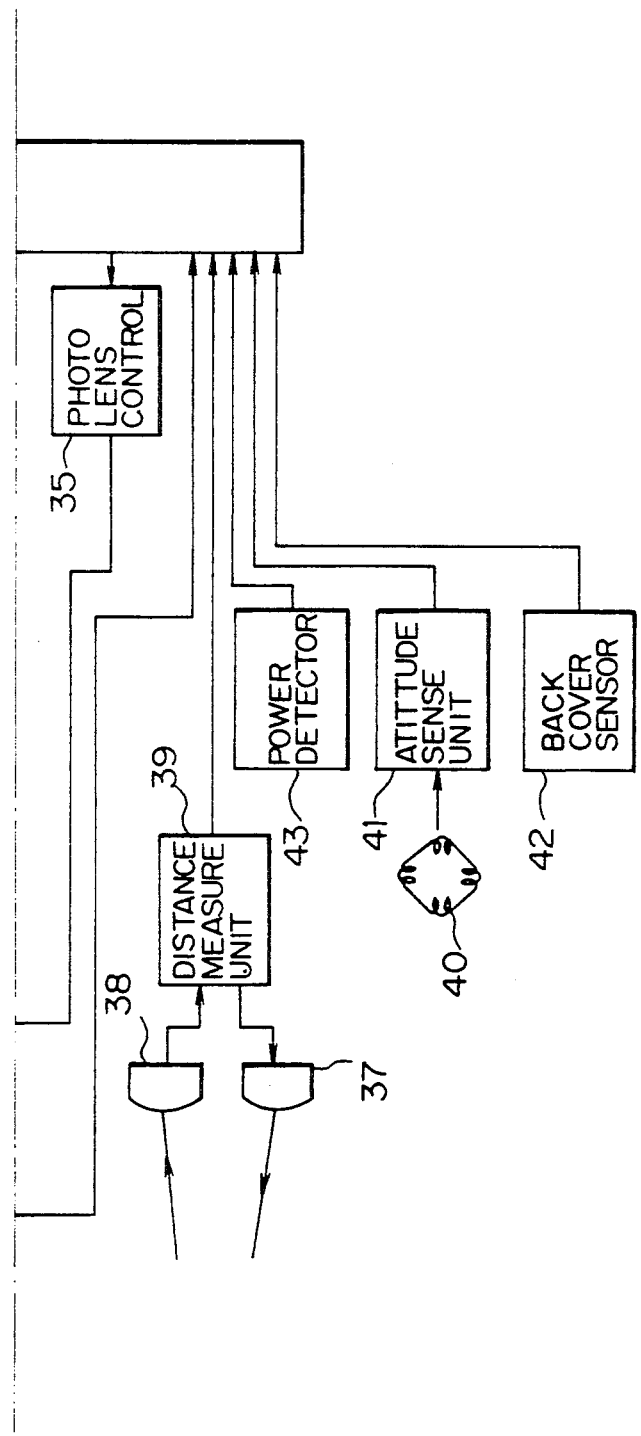

FIG. 1 illustrates a whole construction of the trimming information recordable camera to which the present invention is applied. The camera is arranged in such a manner that trimming information is written on a recording medium such as film set in the camera and that the film is printed according to the trimming information read in the labo-system.

In FIG. 1, numeral 1 designates a whole camera controlling and calculating unit which controls and calculates to function the whole structure of the camera. The camera comprises a zoom button 2 for zooming a view finder, a luminous sensor switch 3 for starting the luminous sensing operation, a release switch 4 for releasing a shutter, a manual rewind button 5 for manually rewinding the film back into the cartridge, a date write mode button 6 for selecting whether the photographing date is to be printed or not, a strobo 7, and a strobo actuator (strobo driving circuit) 8 for driving the strobo optical system in cooperation with the zoom system to change the irradiation angle of the strobo light. Numeral 9 designates a strobo control unit which controls the luminous intensity of the strobo light in cooperation with the release switch 4 in the case of strobo-photographing. The camera further comprises an outer display unit 10 for displaying various information necessary for manipulating the camera, an inside display 11 for displaying various information in the finder, a zoom finder optical system 12, a zoom finder driving unit 13 comprising a motor and a transmission system, and a zoom finder control unit 14. Numeral 15 designates a finder position detector for detecting the position of the finder (view field angle of the finder) so that in response to the detection signal the zoom optical system 12 is controlled by the control unit 14 through the driving unit 13. Also, the finder position detection signal is transmitted from the detector 15 to the control and calculation unit 1. The information data output from the detector 15 are trimming information data ($T_1$, $T_2$, $T_3$), a focus lens position data (F.L.P.) which indicates the focal length of the photographing lens, and a trimming point (T.P.) where the zooming motor is to be stopped.

The camera further comprises a photo detector element 16, a photo detector unit 17 for converting the output signal of the element 16 to the signal which can be introduced to the control and calculation unit 1, a shutter 18, a shutter drive 19, and a shutter controller 20 which controls the shutter 18 through the drive 19 on the basis of the shutter speed calculated by the unit 1. Numerals 21, 22, and 23 designate a film, a spool for winding the film, and a film cartridge, respectively. Numeral 24 designates a film advancing drive unit. Numeral 25 designates a film motion control unit which controls the advancing or backward motion of the film (winding and rewinding of the film) by controlling the spool 22 at the time of winding the film while controlling the cartridge 23 at the time of rewinding the film, through the drive 24 in response to the command signal from the unit 1.

Numeral 26 designates a perforation detector which detects perforations of the film. Numeral 27 designates a perforation detecting circuit which detects the motion and the number of the perforations in cooperation with the detector 26. Numerals 28, 29, and 30 designate a light emitting means such as an LED, and LED drive means, and an LED control unit, respectively. The perforation detecting means (26 and 27) may comprise a sprocket detection means which detects the rotation of the film feeding sprocket having teeth each engaging through the perforation of the film. Or otherwise, the perforation detecting means may comprise an optical detection means composed of a photocoupler arranged so that the film passes therethrough, electrical or mechanical contact means having contacts in both sides of the film, or permittivity detection means which detects the permittivity of the film.

Data of information such as date (year, month and day or time) are written between the perforations of the film in response to the command from the unit 1 by turning on and off the LED 28 by the control unit 30 through the drive 29 under the state of being synchronized with the signal from the perforation detecting circuit 27.

Numeral 31 designates a CAS code reader which reads information (CAS code) on the sensitivity of the film loaded in the camera, for example. Numeral 32 designates a cartridge detector which detects whether the cartridge 23 is loaded in the camera or not. Numeral 33 designates a photographing lens comprising a first lens group and a second lens group. Numeral 34 designates a photographing lens drive which comprises a motor and a transmission system for driving the first lens group for adjusting the focus of the lens and the second lens group for changing the focal point of the lens between the two points of the two-focal point camera. Numeral 35 designates a photographing lens control unit which controls the focus of the lens 33 and changes the focal point of the lens between the two points through the drive 34 in response to the command from the unit 1. Numeral 36 designates a photographing lens position detector which detects the position of the first lens group of the lens 33. Numerals 37 and 38 designate a light emitting element and a light receiving element, respectively, which is arranged to measure the distance to the subject in conjunction with a distance measuring unit 39. Numerals 40 and 41 designate an attitude sensor and an attitude detecting circuit, respectively. Four attitudes of the camera are detected by the circuit 41 on the basis of attitude information transmitted from the sensor 40. Numeral 42 designates a back cover detector which detects whether the back cover of the camera is opened or closed. Numeral 43 designates a power voltage detector.

Figure 2:
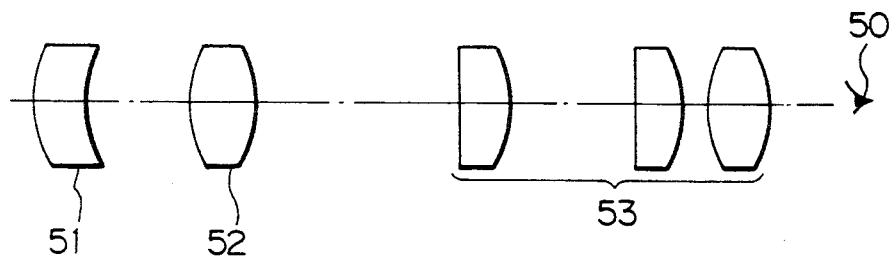
FIG. 2 is a constructional view of the optical system of the zoom finder of the camera in accordance with the embodiment of FIG. 1.

FIG. 2 illustrates an example of the optical system of the zoom finder assembled in the camera of FIG. 1. The zoom finder optical system basically comprises three groups, i.e., an object variator lens system 51, an object compensator lens system 52, and an eyepiece lens system 53. The systems 51 and 52 are driven to move keeping a predetermined positional relation with each other while the system 53 is fixed except when the diopter of the lens is to be corrected.

The lens system 51 functions to change the view field angle. On the other hand, the lens system 52 functions to maintain the focal point (diopter of the finder) to be unchanged which would change according to the movement of the system 51. The lens system 51 moves to change the view field angle maintaining the diopter of the finder by keeping a predetermined positional relation with the lens system 52.

Figure 3:
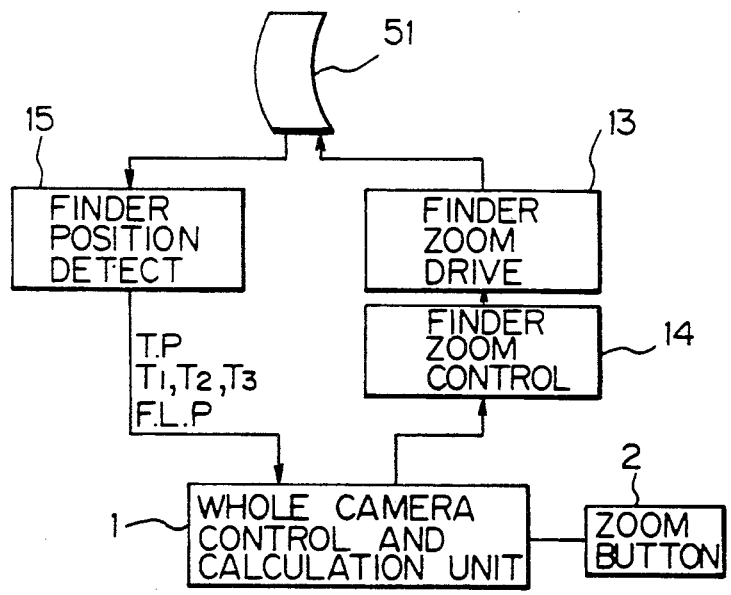
FIG. 3 is a block diagram of the control system for the object variator lens system assembled in the zoom finder arrangement of FIG. 2.

FIG. 3 illustrates a control system for controlling the lens system 51 of FIG. 2. The same numerals of the parts in FIG. 3 designate the same parts of FIGS. 1 and 2.

When the zoom button 2 which is disposed on the camera body is pushed, the unit 1 transmits information of the manipulation state of the button 2 to the finder zoom control unit 14. It is to be noted that if the unit 1 is not in the state of accepting the signal from the button 2 such as when the shutter is functioning, the information data of the button state is not transmitted to the unit 14.

The information transmitted to the control unit 14 is information on the rotary direction of the motor, i.e., a first zooming direction from the tele-photographing state to the wide-photographing state or a second zooming direction from wide-photographing state to the tele-photographing state. In accordance with the information transmitted from the unit 1 to the unit 14, a finder zoom motor (F.Z. motor) of the drive unit 13 is rotated so as to move the lens system 51 continuously toward the wide-photographing position or tele-photographing position through the transmission system comprising gears.

When the zoom button 2 is released from being manipulated, the F.Z. motor is deenergized and stops the rotary motion. If the stop position of the motor is between the steps of table-2 mentioned before, the printed photograph sometimes becomes different from the subject of the finder view field. To avoid this, the finder position detecting unit 16 is arranged to output information signals indicating that the motor stop position is at a trimming point (point of numbered position in table-2) or not so that the unit 1 controls the trimming system in accordance with this information output from the unit 16.

The signals output from the unit 16 and read by the unit 1 are a trimming point signal (T.P.), trimming information bits ($T_1$, $T_2$, and $T_3$) and a focus lens position signal (F.L.P.).

Figure 4:
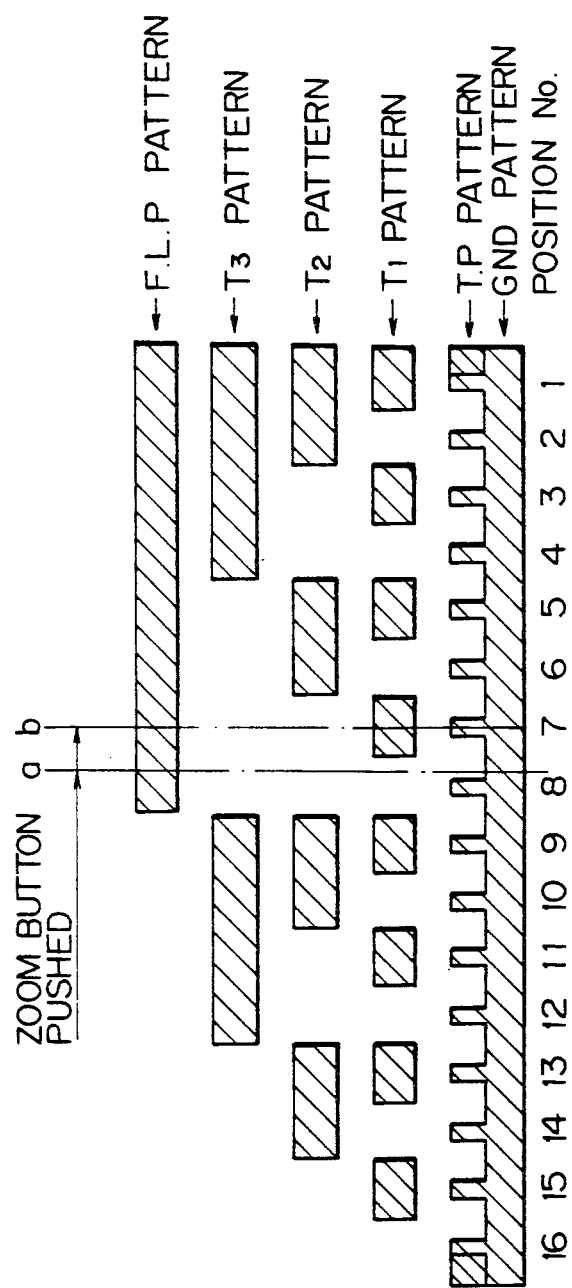
FIG. 4 is an explanatory view of information signal patterns output from the finder field angle detection means assembled in the structure according to the embodiment of FIG. 1.

FIG. 4 illustrates examples of signal pattern output from the finder position detecting unit 15. A brush of the finder zoom drive 13 slides on the patterns of FIG. 4 and scans them to detect the finder position.

For the sake of better understanding, it is assumed that the zoom button 2 is manipulated to move the brush to the right in the drawing at the position number 13 and that the button 2 is released at the position 'a'. If the F.Z. motor is stopped immediately, a right information is not obtained from the finder position detecting unit 15. Therefore, to obtain a right information, a trimming point signal pattern (T.P.) is formed as illustrated in FIG. 4 so that the motor is stopped at the position 'b' where the next T.P. pattern is detected. This controlling operation is carried out in such a way that the T.P. signal output from the unit 15 is transmitted to the unit 1 which then controls and actuates the finder zoom controller 14 to stop the motor at the position of T.P. signal pattern.

Figure 5A:
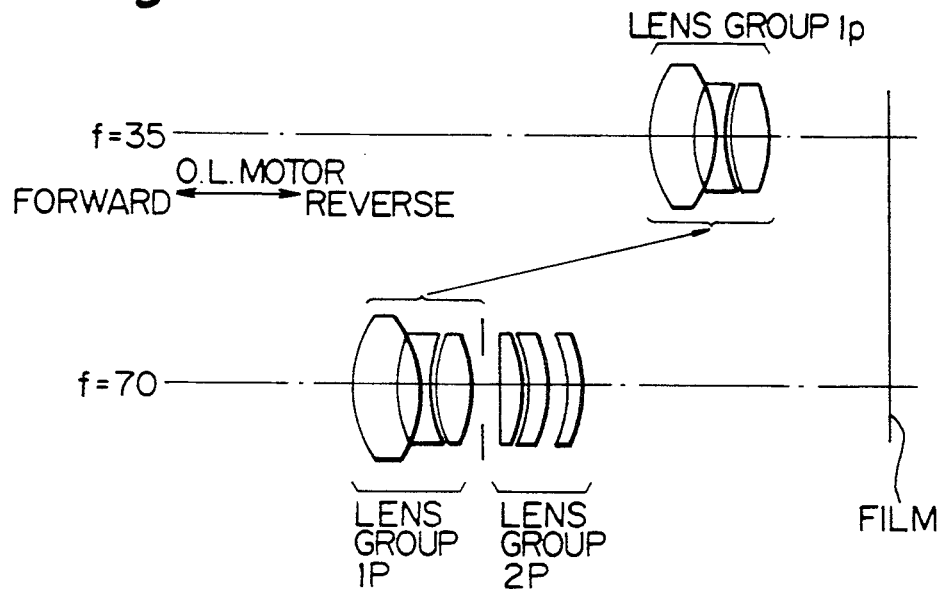
FIGS. 5a and 5b are explanatory views for explaining the principle of the function of the two-focal point lens in accordance with an embodiment of the present invention.
Figure 5B:
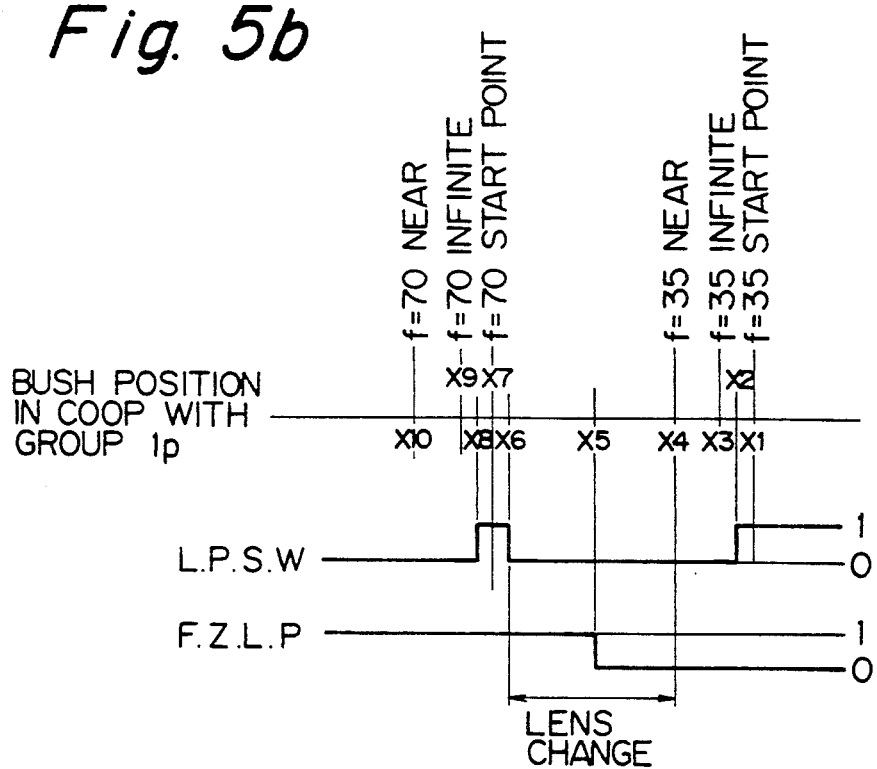

FIGS. 5a and 5b illustrate the principle of focal length changing function of the two-focal point photographing lens in accordance with an embodiment of the present invention. The two-focal point lens is constituted from a first lens group 1p and a second lens group 2p, as illustrated in FIG. 5a. The focal point when f=35 is adjusted by the forward and backward motion of the lens group 1p.

When the focus is to be changed from f=35 to f=70, the lens group 1p is operated leftward in FIG. 5a and the lens group 2p is inserted behind the lens group 1p as illustrated in FIG. 5a.

The focal point when f=70 is also adjusted by the forward and backward motion of the lens group 1p as when f=35.

After the photograph is taken, the lens group 1p is set at the start point X7 in FIG. 5b in the case of f=70, while it is set at the start point X1 in the case of f=35.

When the lens group 1p is positioned at X7 or X1, if the focus lens position (F.L.P.) and the focus zoom lens position (F.Z.L.P.) are not equal to each other, that is, in the case where F.L.P.=0 and F.Z.L.P.=1 or in the case where F.L.P.=1 and F.Z.L.P.=0, it becomes necessary to change the focus of the photographing lens (object lens).

(1) When the zoom button 2 is released and after that the button 2 is not reactuated for a predetermined time, the F.L.P. and F.Z.L.P. are compared with each other. When the F.L.P. and F.Z.L.P. are equal together, it becomes unnecessary to change the focus of the photographing lens. Therefore, the control system arrangement is changed from the state wherein the introduction of the signal from the switch 3 is forbidden to the state wherein the signal from the luminous sensor switch 3 is accepted.

When the F.L.P. value and the F.Z.L.P. value are different from each other, introduction of the signals from outside manipulation buttons such as the switch button 3 is forbidden. In the event when F.L.P.=0 and F.Z.L.P.=1, it becomes necessary to make the state as f=35 in FIG. 5a. Therefore, the photographing lens drive (object lens motor) 34 is reversed.

After a predetermined time ($T_1$) has passed, the position of the lens group 1p is read from the lens position switch signal (L.P.S.W) output from the lens position detection unit 38. When a predetermined time ($T_2$) has passed after the L.P.S.W signal becomes "1", the motor 34 is stopped. By controlling the lens system in such a way, it becomes possible to stop the lens group 1p at the start point X1 of f=35 in FIG. 5b.

The time $T_1$ is determined so that it fully covers the time to move from the position X7 to the position X6 in FIG. 5b. Also, the time $T_2$ is determined so that it fully covers the time the L.P.S.W value changes from "0" to "1" including a margin for absorbing the mechanical play such as backlash of the lens drive system between the positions X2 and X1 of FIG. 5b. The lens group 2p is mechanically moved away from the optical axis during the time when the lens group 1p is moving between the positions X6 and X4.

When F.L.P.=1 and F.Z.L.P.=0, it becomes necessary to make the focus state as f=70 in FIG. 5a. Therefore, the motor of the drive 34 is rotated in the forward direction and stopped at the start point X7 of f=70 in FIG. 5b. Except for this arrangement, the motion and function of the lens system are substantially the same as those in the case of when F.L.P.=0 and F.Z.L.P.=1, mentioned above.

It is to be noted that instead of using the predetermined times $T_1$ and $T_2$ as in the above mentioned embodiment, it is possible to use predetermined pulses $P_1$ and $P_2$, respectively, to obtain the same function and effect of the invention.

(2) After the zoom button 2 is released, when the switch 3 is actuated, the distance is measured. After that, F.L.P. and F.Z.L.P. are compared. There are two functions in response to the result of the comparison.

① When F.L.P. and F.Z.L.P. Equal Together

First, a predetermined amount is added to the pulse number or count number corresponding to the forward motion amount of the lens group 1p detected by measuring the distance. After that, the O.L. motor of the drive 34 is rotated in the forward direction while monitoring the L.P.S.W signal. When the L.P.S.W signal is changed from "1" to "0", the lens group 1p is moved by the focus amount and the motor is stopped.

It is to be noted that the above-mentioned predetermined amount means an offset amount corresponding to the focus adjusting amount at the time of adjusting the focus of each camera. In case that the offset amounts when f=35 and when f=70 are different in the same camera, it is possible to select the amount on the basis of the F.Z.L.P. signal. Information on the adjusting amount is written in a semi-fixed resistance or an electrically rewritable read only memory (EEPROM) arranged in the unit 1.

② When F.L.P. and F.Z.L.P. Not Equal (i) When F.L.P. =0 and F.Z.L.P. =1, the O.L. motor is reversed and the L.P.S.W signal is checked when a predetermined time $T_1$ has passed after the motor is reversed. When a predetermined time $T_2$ has passed after the L.P.S.W signal becomes "1", the motor is driven in the forward direction to move the lens group 1p by the focus amount. Then the motor is stopped. It is to be noted that the predetermined time $T_1$ means the time which fully covers the time period wherein the lens moves from the position X7 to the position X6 in FIG. 5b. Also, the predetermined time $T_2$ corresponds to the time which fully covers the time period wherein the L.P. S.W signal changes from "0" to "1" including a margin due to the mechanical play such as backlash of the lens drive system between the positions X2 and X1 in FIG. 5b. Also, it is possible to use the pulse number $P_1$ and $P_2$ to control the system instead of the predetermined times $T_1$ and $T_2$.

(ii) When F.L.P. =1 and F.Z.L.P. =0, the O.L. motor is driven in the forward direction and the L. P.S.W signal is checked when a predetermined time $T_1$ has passed after the motor is rotated in the forward direction. When the signal becomes "1" and then changes to "0" again, the lens group 1p is moved by the focus amount. After that, the motor is stopped. The pulse numbers can be used instead of the predetermined times $T_1$ and $T_2$ to control the system, as mentioned above in the case of (i).

The lens group 2p is moved onto or away from the optical axis mechanically during when the lens group 1p is moving between the positions X6 and X4 in FIG. 5b.

Figure 6:
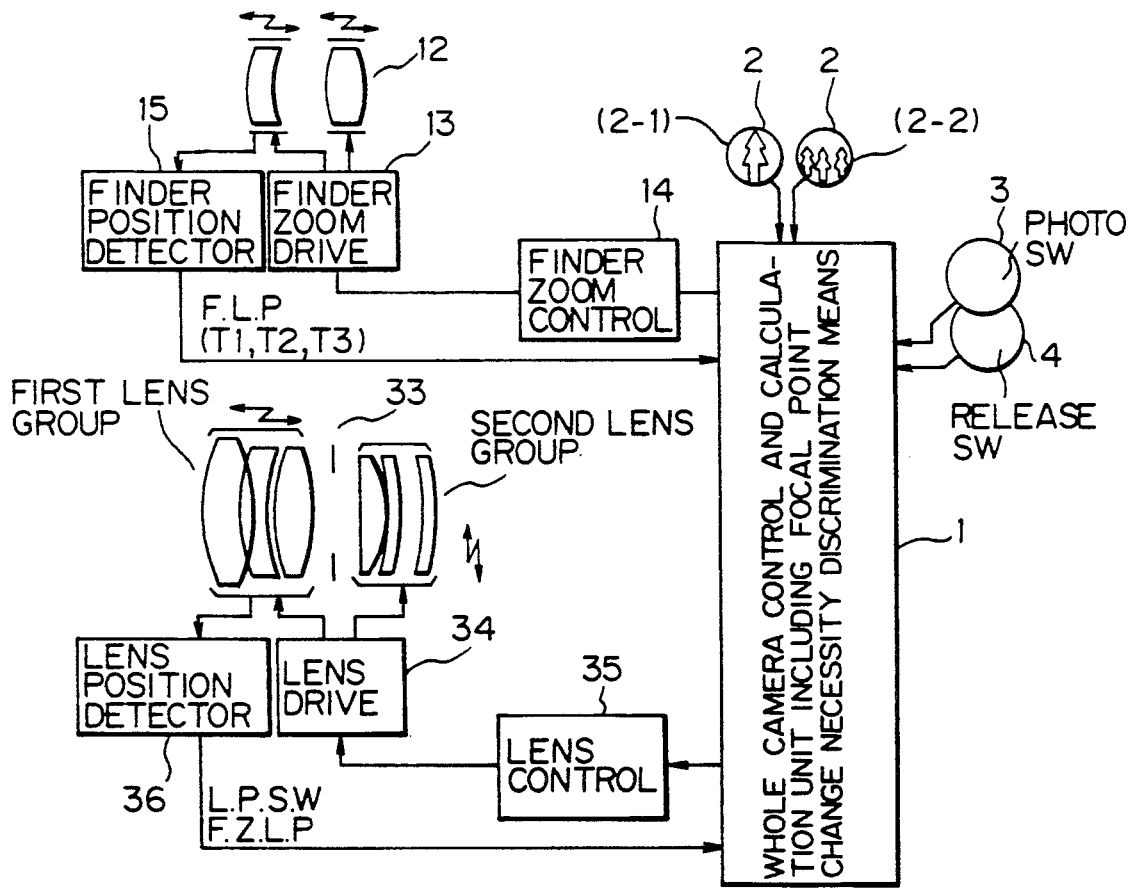
FIG. 6 is a constructional view of a main portion of the optical system including the finder and the photographing lens of the trimming information recordable camera in accordance with the present invention.
Figure 7:
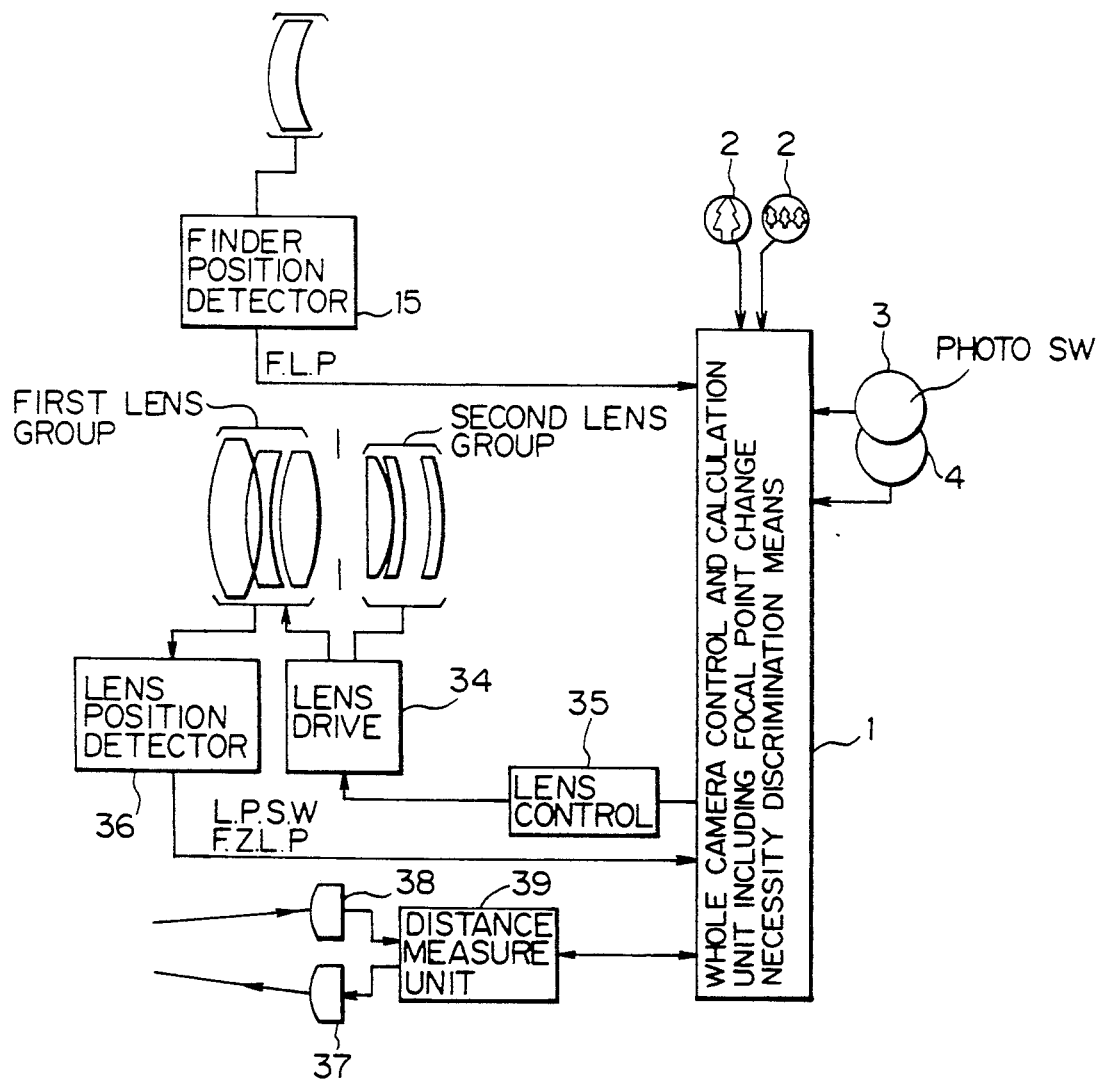
FIG. 7 is a constructional view of a main portion of the optical system including the finder, the photographing lens and the distance measuring means of the trimming information recordable camera in accordance with the present invention.

FIGS. 6 and 7 illustrate a main portion of the trimming information recordable camera in accordance with the present invention. The corresponding or same parts are designated by the same numerals as the structure of FIG. 1.

The function of the paragraph (1) mentioned above with reference to FIGS. 5 is further described hereinafter referring to FIG. 6.

Numeral 2-1 designates a zoom button for shifting the zoom system toward the wide-view field angle direction. And numeral 2—2 designates a zoom button for shifting the zoom system toward the telescopic direction. When the button 2-1 or 2—2 is pressed and then released, the unit 1 reads the F.L. P. signal and F.Z.L.P. signal from the finder position detecting unit 15 and the photographing lens position detecting unit 38, respectively. The unit 1 compares the two signals.

If the two signal values are equal to each other, it is unnecessary to change the focus of the lens. Therefore, the state wherein the signal from the luminous sensor switch 3 is forbidden to enter the unit 1 is released.

On the other hand, if the two signal values are different from each other, the signals from the outside manipulation buttons such as switch 3 are forbidden to enter the unit 1.

When F.L.P. =0 and F.Z.L.P. =1, the control unit 35 actuates the drive 34 to reverse the photographing lens drive motor (O.L. motor) to rotate in the backward direction so that the lens state becomes as f=35. After that, when a predetermined time $T_1$ has passed, the L.P.S.W signal is checked by the detecting unit 36. After the signal becomes "1", when a predetermined time $T_2$ has passed, the control unit 35 stops the motor. The focal length of the photographing lens is mechanically changed prior to the detection of signal "1" of L.P.S.W by driving the motor of the drive unit 34.

On the other hand, when F.L.P. =1 and F.Z.L.P. =0, the motor is driven to rotate in the forward direction so as to make the lens state of f=70. After the motor is actuated, when a predetermined time $T_1$ has passed, the L.P.S.W signal output from the unit 35 checked. When a predetermined time $T_2$ has passed after the signal is changed to "1", the control unit 35 stops the motor.

Next, the function of paragraph (2) mentioned before with reference to FIGS. 5 is further described hereinafter referring to FIG. 7.

When the switch 3 is manipulated, the unit 1 actuates the distance measuring unit 39 to measure the distance. Also, the unit 1 reads the F.L.P. signal which is the information signal on the finder view field angle from the detecting unit 15. The unit 1 also reads the F.Z.L.P. signal which is the information signal on the focal length of the photographing lens now on arrange from the detecting unit 36. The two signals are compared in the unit 1.

When the two signals are equal together, a pulse number corresponding to the focus amount is added to the pulse number corresponding to the operated amount of the lens group 1p which is obtained from the above-mentioned measurement of the distance. Then the unit 35 is actuated to drive the motor of the unit 34 to rotate in the forward direction. The L.P.S.W signal from the unit 36 is monitored so that when the signal is changed from "1" to "0", the lens is operated by the focus amount after that by the motor. Then the unit 35 stops the motor.

On the other hand, when the two signals are different from each other, the unit 1 controls the unit 35 in response to the values of the signals so that the motor of the drive unit 34 is actuated backward or forward. After that, when a predetermined time $T_1$ has passed, the unit 1 checks the L.P.S.W signal output from the detecting unit 36. When the L.P.S.W signal becomes "1" and when F. Z.L.P. =1, the control unit 35 stops the motor after a predetermined time $T_2$ has passed and after that actuates the motor in the forward direction to operate the lens group 1p by the focus amount. Then the motor is stopped.

If F.Z.L.P. =0, the motor is controlled in such a way that when the F.Z.L.P. signal turns to "1" and after that changes to "0" again, the lens group is operated by the focus amount and after that the motor is stopped.

Embodiments of the present invention having the structure illustrated in FIG. 1 are further described hereinafter. Improvements of the embodiments described below reside in the information data writing means.

Figure 8:
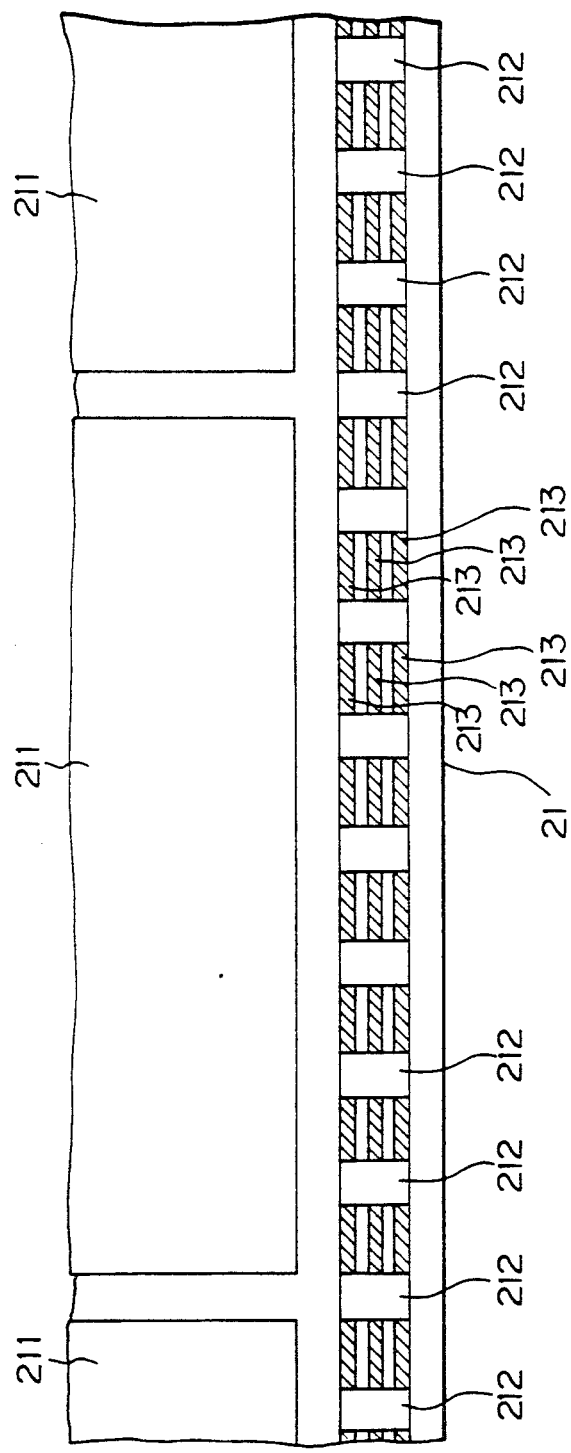
FIG. 8 is an explanatory view for explaining positions where information data is written in the film in accordance with an embodiment of the camera of the present invention.

FIG. 8 illustrates data writing portions on the film in accordance with an embodiment of the present invention.

In FIG. 8, numeral 21 designates a film as a whole and numerals 211, 212, and 213 designate a frame, a perforation and a data writing position, respectively.

As can be seen from FIG. 8, each data writing position 213 is disposed between perforations 212 formed along the lower edge (or upper edge) of the frame 211 of the film. The data is written in the portion 213 by turning on and off the light emitting means comprising a plurality of LEDs during the advancing motion of the film. Also, the data can be renewed every time one perforation is advanced. Eight positions 213 are disposed along one frame edge. Therefore, if three LEDs are used, for example, data of 24 bits, i.e., $3 \times 8 = 24$, can be input for one frame.

The perforations 212 are detected, as illustrated in FIG. 1, by the detector 26 and the detecting unit 27. On the basis of the detection signal of the perforations 212 output from the unit 27, the unit 1 controls the light emission controller 30 to control the turning on and off of the LEDs through the LED actrator 29 as well as controls the film advancing motion through the film driver by the film advance motion controller 25 so that the data is written in the space between every adjacent two perforations 212 during the film advancing motion.

As illustrated in FIG. 8, the data is written in the outside of the frame of the film. The data is read in the labo-system at the time of printing the film on a print paper. The labo-system comprises a line sensor for reading the data written in the film and automatically controls the printing operation such as deciding whether the date is to be printed or not, or determining the magnification of the printing zoom lens on the basis of the read data which is written in the film.

It is necessary that the labo-system is so arranged that reading errors can be avoided as possible. Therefore, the data on the film have to be precisely aligned with the line sensor for reading the data installed in the labo-system.

The problems are:

(i) that the aperture size of the camera body is different for respective camera;

(ii) that the frame is inclined with respect to the film due to the difference between the tolerance of the 35 mm film width and that of the width of the rail for guiding the film in the camera; and (iii) that the frame size minutely changes according to the zooming motion in the case of a zoom lens camera.

However, in accordance with the present invention, these problems are attenuated or the reliability of reading data is not impaired by the problems, since the data area on the film for one bit of information is large due to the arrangement wherein the data is written in the space between the perforations of the film when compared with the arrangement of the prior art disclosed in Japanese Patent Application Laying Open (KOKAI) No. 62-50743, for example.

It is to be noted that a plurality of LEDs (three LEDs in this particular embodiment) are disposed side by side at a same position with respect to the film advancing direction within the area where the perforations passes with respect to the lateral direction of the film.

The data is written in the film by on-off control of the light emitting means, i.e., LEDs in this particular embodiment. However, instead of such an optical means, it is possible to use a magnetic means for writing data in the film. In the case where the magnetic means is used, the data is written in the film in such a way that a magnetic recording band such as transparent magnetic layer, for example, is formed on the film in advance and that a magnetic recording means installed in the camera writes the data on the magnetic layer in a manner synchronized with the detection signal of the perforations.

Or otherwise, a thermal recording means may be adopted to write the data on the film. In this case, a heat-sensitive layer is formed on the film in advance so that the data is written on the layer by a thermal means.

The embodiment of the present invention illustrated in FIG. 8 has advantages as follows.

(1) The data is not destroyed if the film is cut at the time of editing the film since the data is written in the space between the perforations of the film.

(2) A large space can be alloted for writing the data for one frame on the film since eight perforations are formed along one frame so that eight writing positions between the perforations can be obtained, which makes it possible to reduce the number of LEDs for writing the data, resulting in that the cost is lowered and the space for wiring the circuit of LEDs can be reduced.

(3) It becomes possible to prevent the problem of flare from arising at the time of writing the data in the space between the perforations, that is, the photograph in the frame is not optically influenced by the LEDs for writing the data.

(4) It becomes possible to reduce the accuracy of positioning the LEDs for writing the data since the data recording area is large.

Figure 9:
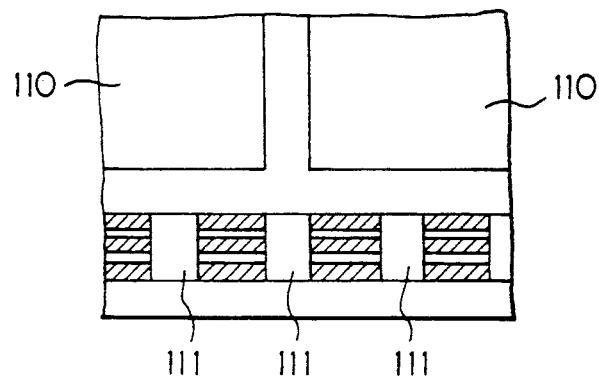
FIG. 9 is an explanatory view of the perforations formed on a film.

In the embodiment having the data writing arrangement mentioned above, it is necessary to form perforations in such a manner that one perforation 111 is disposed at the position of frame line, i.e., the position between adjacent two frames 110, as illustrated in FIG. 9, so that the center of the perforation coincides with the center of the frame line with respect to the longitudinal direction of the film. That way, it becomes possible to use the space most efficiently for writing the data and prevent the data from being destroyed when the film is cut along the frame line at the time of editing operation.

Figure 10:
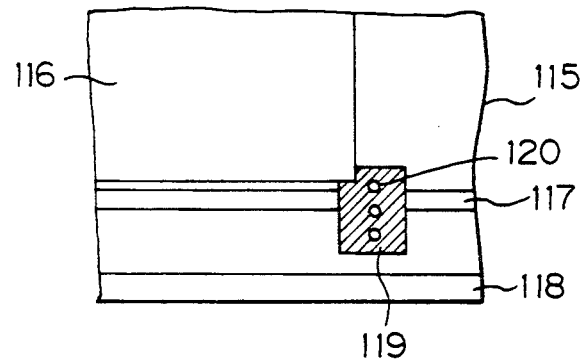
FIG. 10 is an explanatory view for explaining problems concerning the position of the light emitting means.

With such an arrangement of the perforations, it is necessary to dispose the light emission means (LEDs) 120 at a position designated by numeral 119 in FIG. 10 which illustrates a camera body 115, an aperture 116 and a film guide means comprising an inside rail 117 and an outside rail 118. However, in accordance with the LED layout of FIG. 10, the inside rail 117 is obstructed by the LEDs in the vicinity of the aperture 116, which impairs the film condition at the time of photographing since the rail becomes unstable at the position of the aperture.

Figure 11:
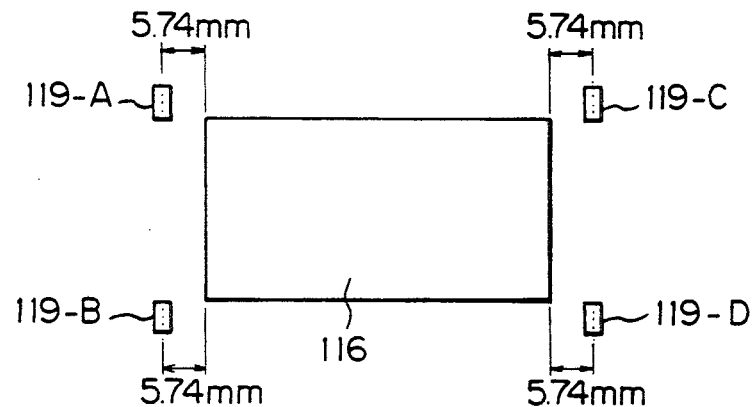
FIG. 11 is a plan view of a part of the film showing an example of the layout of the light emitting means.

To cope with this problem, the LEDs are disposed at one of the positions 119-A to 119-D, illustrated in FIG. 11, which positions are away from the aperture 116 by a predetermined length. The position is selected depending on the conditions of the film cartridge position, that is, whether the cartridge is disposed in the right or left of the aperture seen from the back cover side and the film winding type. There are two film winding types. A first winding type is arranged in such a way that the film is advanced and wound on the spool in the camera according as the frame is used to photograph one by one and when all of the frames are photographed, the film is rewound back into the cartridge. A second winding type is arranged in such a way that the film is first taken out from the cartridge and wound on the spool in the camera before photographing and that the film is rewound back into the cartridge according as the frame is used to photograph one by one.

In FIG. 11, each position of LEDs 119 is disposed 5.74 mm away from the aperture edge. This length 5.74 mm is derived from the perforation pitch (4.75 mm) plus a half of the perforation width (1.98 mm).

Figure 12:
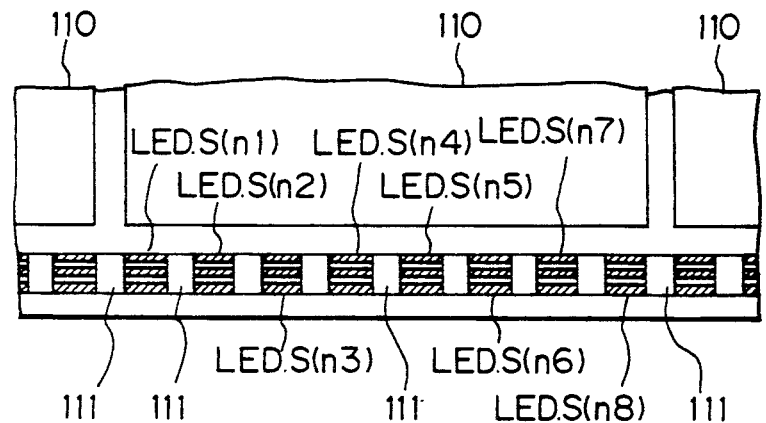
FIG. 12 is an explanatory view of the data writing position in the film in accordance with the present invention.

FIG. 12 illustrates the data writing areas alloted on the film. As illustrated in FIG. 12, eight data writing areas designated by LED.S(n1) to LED.S(n8) are formed between perforations 111 along the longitudinal direction of one frame 110.

Figure 13:
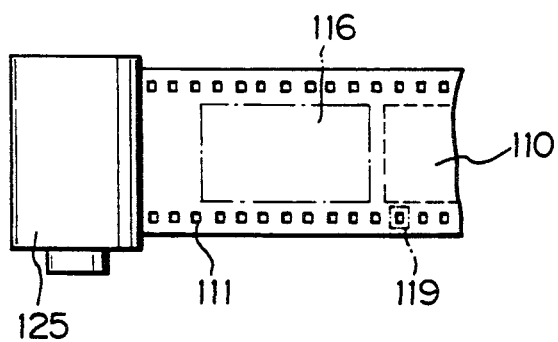
FIG. 13 is an explanatory view of the position of the light emitting means in the case of the normally film winding up type camera.

FIG. 13 illustrates the positional relation between the film, aperture 116 and the light emission means 119, in the case that the film winding type is the first advance winding type mentioned above and that the cartridge 125 is disposed in the left side of the aperture 116.

The LEDs are disposed at the position designated by 119. Therefore, it becomes impossible to write the data in the trailing recording area designated by LED.S(n1) in FIG. 12 during the time the film is advancing after the frame 110 is photographed until the next frame is set behind the aperture 116. Therefore, the data to be written in the area LED.S(n1) of the preceding frame has to be memorized and written at the time of subsequent film advancing motion for the next frame.

However, with regard to the last frame, the data is not recorded in the trailing recording area LED.S(n1) of the eight areas LED.S(n1) to LED.S(n8) of this last frame since the film is not advanced further.

Such a problem is obviated by an embodiment of the present invention described below so that the data is reliably recorded on the film for the last frame.

FIG. 14 illustrates the construction of the main portion of such an embodiment of the present invention.

In FIG. 14, numeral 1 designates a control and calculation unit for controlling the whole structure of the camera. The unit 1 comprises a first data memory 101 for memorizing the information data about the photographing conditions at the time of releasing the shutter, a second data memory 102 for memorizing the information data to be written in the first writing space LED.S(n1) between the perforations for the preceding frame, a perforation count means 103 for counting the perforations detected, a control unit 104 for controlling various parts of the system, a rewind signal output means 105 for transmitting a start signal for rewinding the film back into the cartridge, a frame number detecting means (remaining frame detector) 106 for detecting the remaining frames of the film from the number of the photographed frames memorized in the cartridge, a photographed frame number memory (used frame counter) 107 for counting and memorizing the number of frames which were photographed, a film end discrimination means 108 for detecting the film end by comparing the outputs from the remaining frame detector 106 and the used frame counter 107, and a manual rewind detection means 109 for detecting whether the manual rewinding button is manipulated or not.

The camera of this embodiment further comprises, as the camera of FIG. 1, a release switch 4, a manual rewind button 5, a spool 22, a film cartridge 23, a film feed drive 24, a film feed controller 25, a perforation detector element 26, a perforation detecting circuit 27, a light emission means 28, a light emitter drive 29, a light emitter controller 30, and a CAS code reader 31.

Figure 15A:
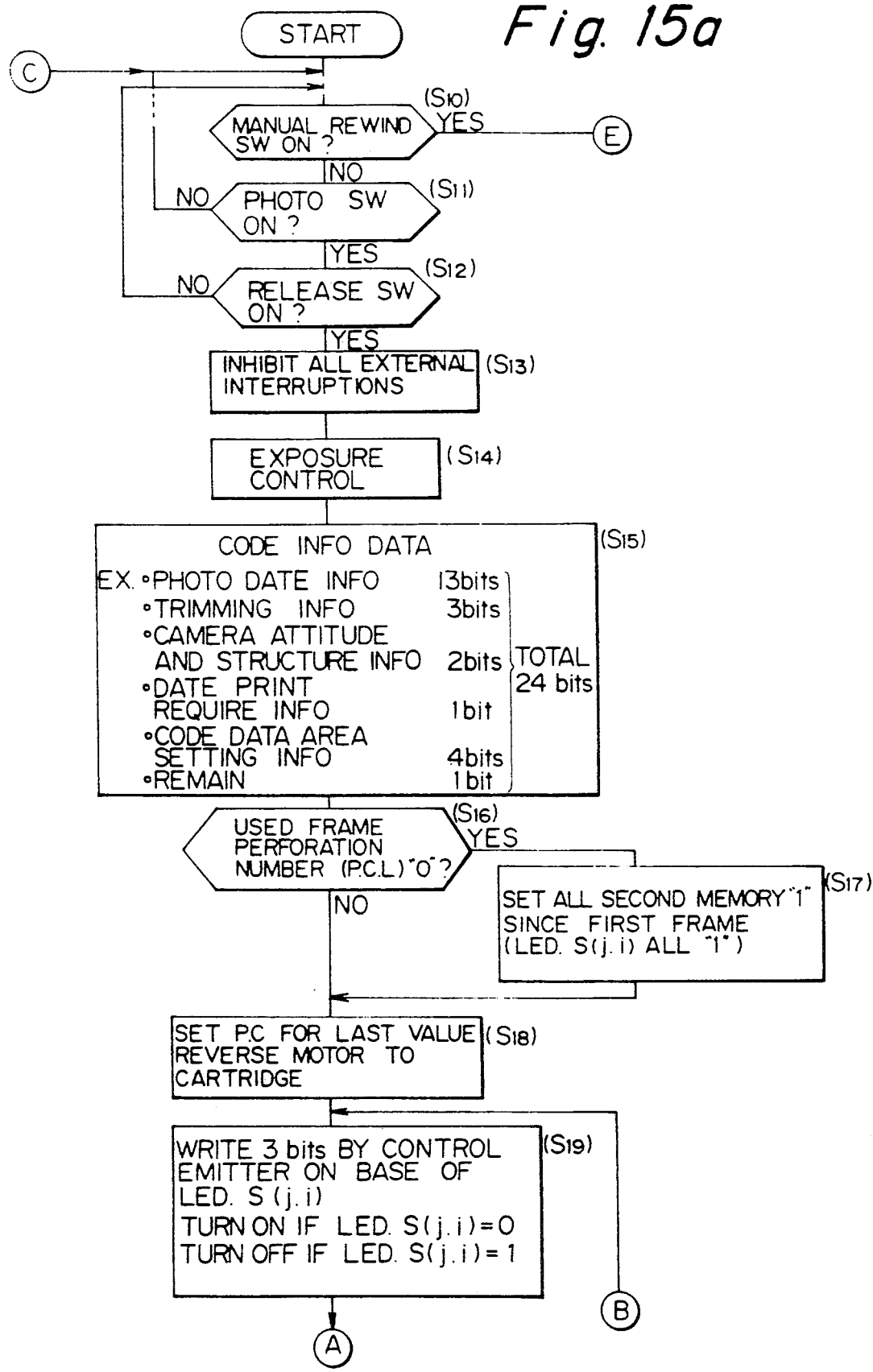
FIGS. 15a to 15c are flow charts of the embodiment of FIG. 14.
Figure 15B:
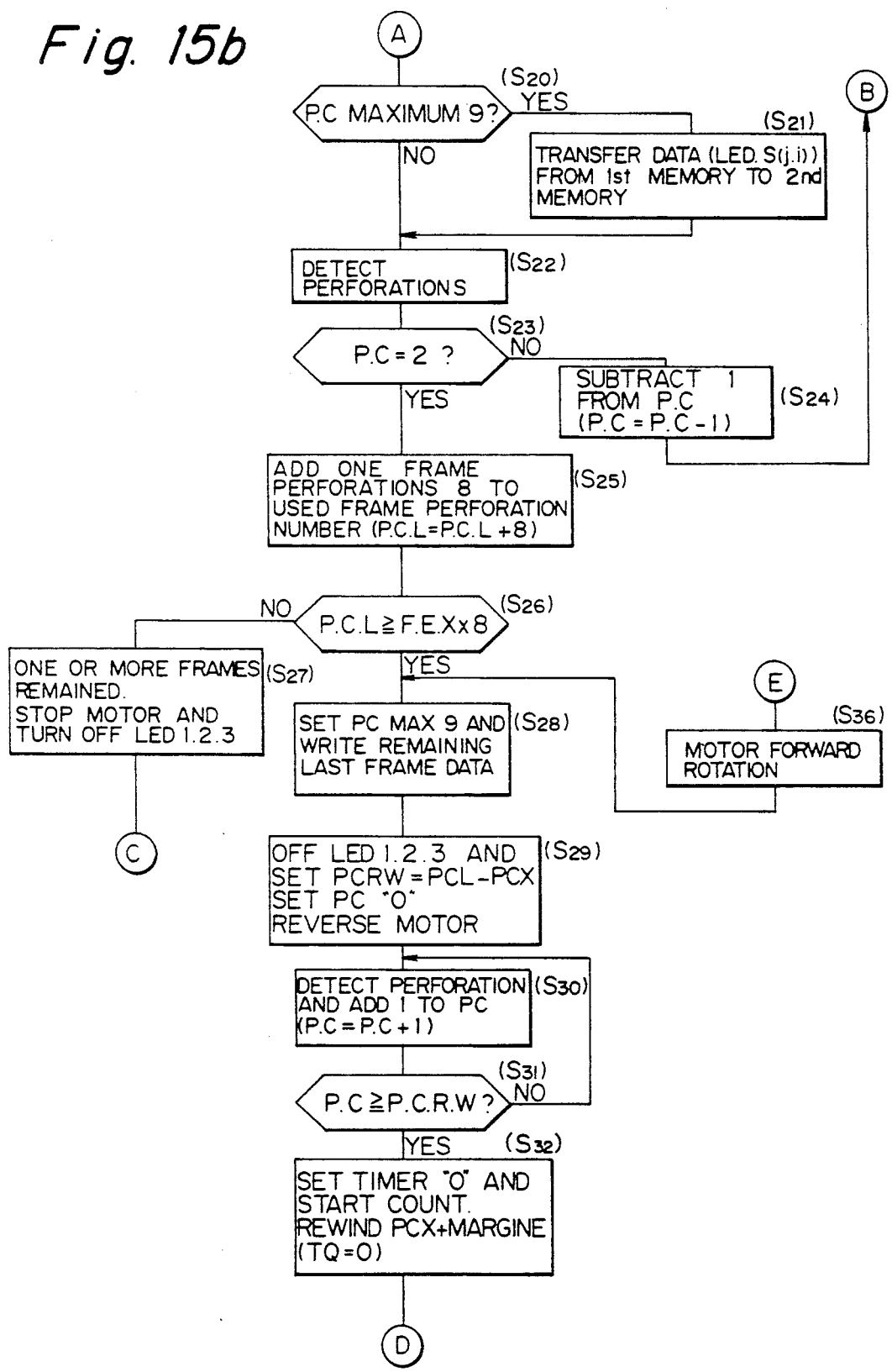
Figure 15C:
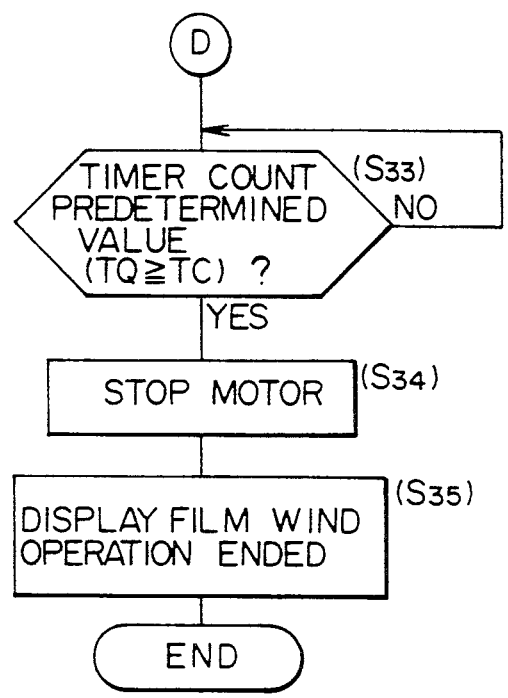

FIGS. 15a to 15c illustrate a flow chart of the function of writing data between perforations in accordance with the embodiment of the present invention.

The function is described hereinafter with reference to FIGS. 14 and 15a to 15c.

First, the release switch 4 is pushed after the distance measuring operation is ended. When the switch 4 is pushed, the control unit 104 inhibits all of the interruptions from outside ($S_{13}$). In this state, the unit 104 measures the luminous intensity and controls the exposure ($S_{14}$). After that, the data to be written is coded ($S_{15}$). Also, the unit 104 discriminates whether the frame being set is the first frame or not by checking the number of the perforations (P.C.L) corresponding to the number of the frames ($S_{16}$).

When the frist frame is being set, the contents of three bits of the second data memory 102 are all set as "1" ($S_{17}$).

After that, the perforation counter 103 is set for the maximum number 9 and film feeding motor is driven in the forward direction to advance the film to the spool side ($S_{18}$). During this feeding motion, the data corresponding to the perforation count number (i) is written on the film by controlling the light emission means 28 of three bits. That is, since the counter 103 is set for the maximum value 9 first, the unit 104 controls the unit 30 to write the data of three bits memorized in the second data memory 102 ($S_{19}$). The three bits are all "1" when the first frame is being set. When the frame other than the first frame is being set, the data is a part of the data for the preceding frame.

After the photograph is taken in the frame, when the count number of the counter 103 is the maximum value 9, the data to be written in the first writing area LED.S(n1) of FIG. 12 is transferred from the first data memory 101 to the second data memory 102 ($S_{21}$). The transferred data is written on the film at the time of photographing the next frame.

If the count number of the counter 103 is not the maximum value 9, the perforations are detected immediately ($S_{22}$). The perforations are detected by the unit 27 in conjunction with the detector element 26. After the perforations are detected, the unit 104 checks whether the count number of the counter 103 is 2 or not ($S_{23}$).

If the count number is not 2, 1 is subtracted from the count number ($S_{24}$) and the contents of the first data memory 101 corresponding to the count number of the counter 103 are written in the corresponding recording spaces between the perforations ($S_{19}$). The data is the one for the frame which is finished to be photographed and now being shifted away from the aperture position.

If the count number is 2, the perforation number 8 for one frame is added to the perforation number (P.C.L) corresponding to the used frames memorized in the memory 107 and the renewed perforation number is memorized in the memory 107 (P.C.L=P.C.L+8).

On the other hand, the number of remaining unused frames (F.E.X) read by the CAS code reader 31 from the cartridge 23 is registered in the frame detector 106. The unit 104 controls the film end discrimination means 108 to compare the value of eight times of F.E.X and the value of P.C.L.

If P.C.L.<8×F.E.X, it means that the film has one or more unused frames remaining. Therefore, the unit 104 controls the film feeding controller 25 to stop the feeding motor. Also, the unit 104 controls the light emission controller 30 to turn off the light emitter 28 ($S_{27}$).

On the other hand, if P.C.L≧8×F.E.X, it means that the trailing frame is photographed and the film has no unused frame remaining. Therefore, the unit 104 controls the controller unit 25 to drive the motor in the forward direction. Also, the unit 104 sets the counter 103 for the maximum value 9 and writes the unrecorded remaining data registered in the second memory 102 on the data writing portion LED.S(n1) between the perforations of the last frame ($S_{28}$).

After that, the unit 30 turns off all of the LEDs 28. Also, the count number of perforations at the time of rewinding the film (P.C.R.W) is set for P.C.L−P.C.X. Note that P.C.X is a constant for setting for P.C.R.W<P.C.L.

However, if P.C.R.W is set as P.C.R.W=P.C.F−P.C.L in the event that P.C.L becomes larger than the genuine number due to a count error, the motor continues to rotate still after the whole of the film has been rewound back into the cartridge, since in that case the condition of count number P.C=P.C.R.W is not satisfied.

To avoid this, P.C.R.W is set for a small number and the motor is driven with the use of a timer (described later) for the time corresponding to P.C.X.

Further, the counter 103 is reset to "0" and then the motor is reversed. In this state wherein the film is being rewound into the cartridge, the perforations of the film is detected by the element 26 and the unit 27 so that the counter 103 counts up the perforation number one by one (P.C=P.C+1) until the count number becomes as P.C≧P.C.R.W.

When the count number becomes as P.C≧P.C.R.W, the motor is further rotated for the time corresponding to P.C.X mentioned above to continue rewinding the film. For this purpose, the unit 104 sets the timer for "0" and starts to count. After a predetermined time set by the timer has passed, the unit 104 controls the unit 25 to stop the motor ($S_{34}$). Then, the state that the film has rewound is displayed ($S_{35}$).

On the other hand, when the manual rewind button 5 is pushed before the last frame is photographed, the unit 104 actuates the circuit 105 to output the rewind start signal to drive the feed motor in the forward direction ($S_{36}$). The unit 104 further controls the unit 25 to write the data of the last frame which is not written yet on the film ($S_{28}$). After that, the feed motor is reversed to rewind the film into the cartridge.

As mentioned above, in accordance with the embodiment of the present invention, it becomes possible to reliably write the necessary data in the space between perforations of the film for the last frame. Also, in the event that the manual rewind button is pushed in the middle of the film, it becomes possible to reliably write the necessary data in the space between perforations of the film.

The above-mentioned embodiment is applied to the camera in which the film is wound according to the first normal winding type wherein the film is advanced every time the frame is photographed and after all the frames are photographed the film is rewound back into the cartridge. There is another film winding type, as mentioned before. According to the second film winding type operation, the entire film is taken out first from the cartridge and wound on the spool before photographing and then the film is rewound back into the cartridge every time the frame is photographed so that the leading frame of the film is photographed last. The present invention can be also applied to the camera of the second film prewinding type as well. The embodiment of the invention applied to the film prewinding type camera is described below.

Figure 16:
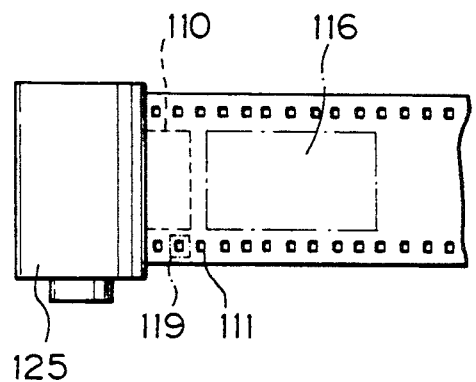
FIG. 16 is an explanatory view of the position of the light emitting means in the case of the pre-winding up type camera.

FIG. 16 illustrates a film layout of an example of the film prewinding type camera. In this example, the cartridge 125 is disposed on the left of the aperture 116 seen from the back side of the camera. LEDs for writing data is disposed at the position 119. The film is rewound into the cartridge 125 when the frame 110 has been photographed. During this rewinding motion of the film, the data of photographing conditions and other information are written in the spaces between the perforations 111. However, when the next frame is set behind the aperture 116, the writing space LED. S(n8) of the preceding frame illustrated in FIG. 12 has not come to the light emission position 119 yet. Therefore, the data to be written in the space LED. S(n8) of the preceding frame is memorized in a memory so that the memorized data is written at the time of film rewinding motion after the subsequent frame has been photographed.

However, with regard to the last frame, the data can not be written in the trailing space LED. S(n8) for the frame since there is no subsequent frames.

The embodiment of the present invention described below obviates this problem and reliably writes the predetermined information data for the last frame.

Figure 17:
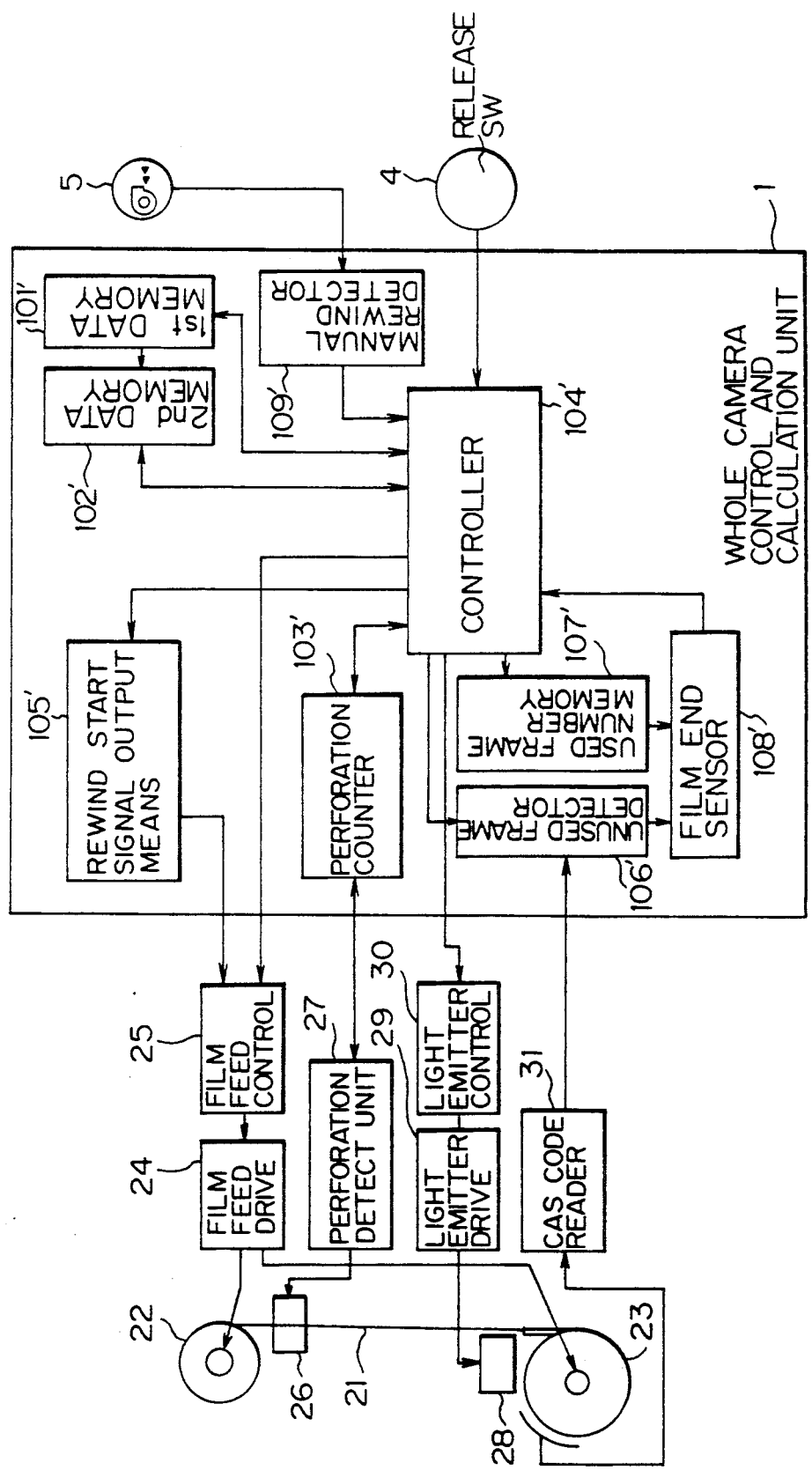
FIG. 17 is a constructional view of a main portion of the camera of FIG. 16.

FIG. 17 illustrates the construction of this embodiment of the present invention.

In FIG. 17, numeral 1 designates a control and calculation unit for controlling the whole structure of the camera. The unit 1 comprises a first data memory 101' for memorizing the information data about the photographing conditions at the time of releasing the shutter, a second data memory 102' for memorizing the information data to be written in the last writing space LED.S(n8) between the perforations for the preceding frame, a perforation count means 103' for counting the perforations detected, a control unit 104' for controlling various parts of the system, a rewind signal output means 105' for transmitting a start signal for rewinding the film back into the cartridge, a frame number detecting means (remaining frame detector) 106' for detecting the unused remaining frames of the film from the CAS code of the cartridge and the information obtained at the time of prewinding the film on the spool, a photographed frame number memory (used frame counter) 107' for counting and memorizing the number of frames which were photographed, a film end discrimination means 108' for detecting the film end by comparing the outputs from the remaining frame detector 106' and the used frame counter 107', and a manual rewind detection means 109' for detecting whether the manual rewinding button is manipulated or not.

The camera of this embodiment further comprises, as the camera of FIG. 1, a release switch 4, a manual rewind button 5, a spool 22, a film cartridge 23, a film feed drive 24, a film feed controller 25, a perforation detector element 26, a perforation detecting circuit 27, a light emission means 28, a light emitter drive 29, a light emitter controller 30, and a CAS code reader 31.

Figure 18A:
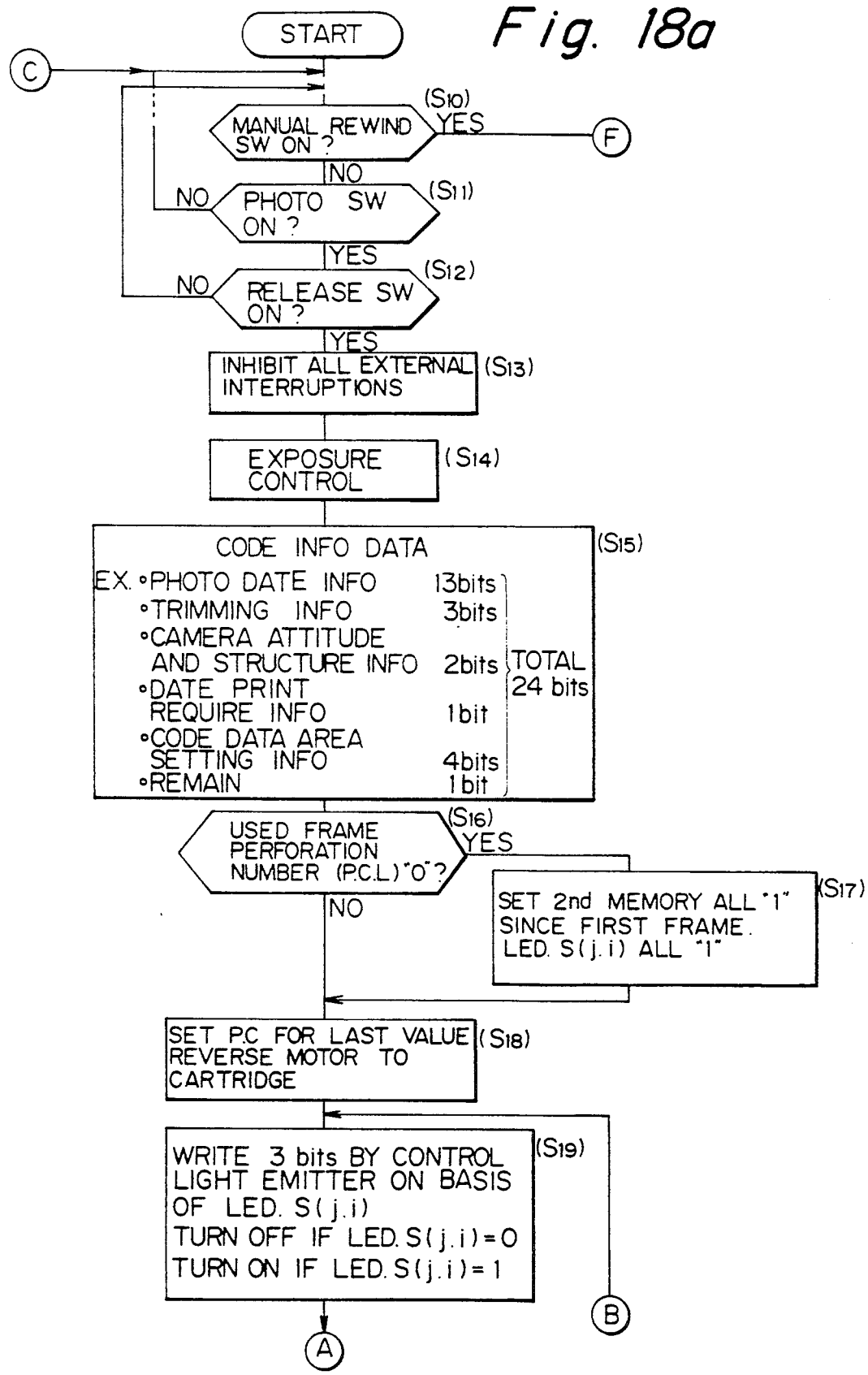
Figure 18C:
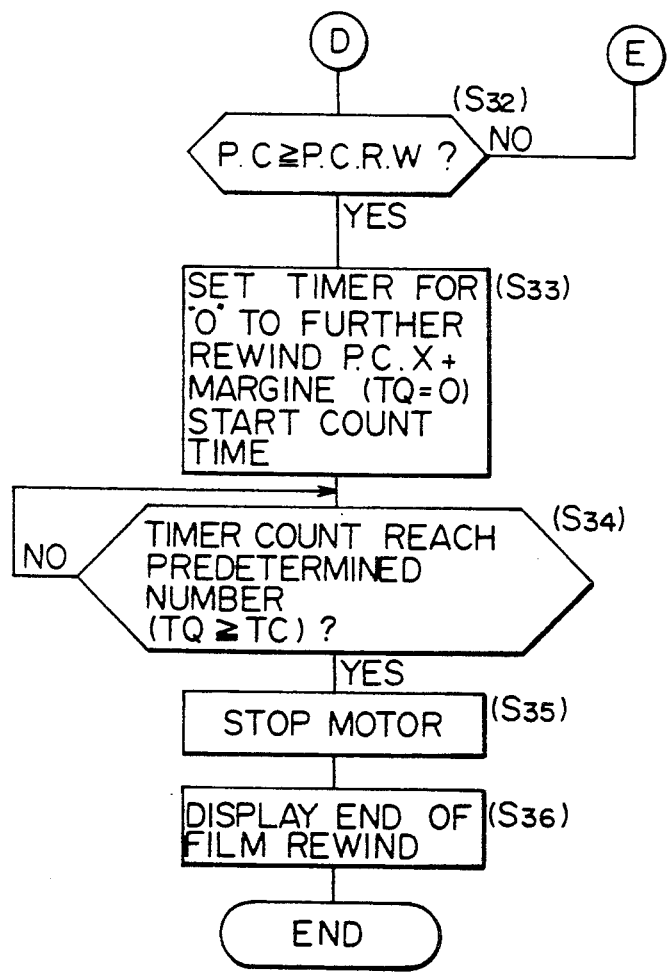

FIGS. 18a to 18c illustrate a flow chart of the function of writing data between perforations in accordance with the embodiment of the present invention.

The function is described hereinafter with reference to FIGS. 17 and 18a to 18c.

First, the release switch 4 is pushed after the distance measuring operation is ended. When the switch 4 is pushed, the control unit 104' inhibits all of the interruptions from outside ($S_{13}$). In this state, the unit 104' measures the luminous intensity and controls the exposure ($S_{14}$). After that, the data to be written is coded ($S_{15}$). Also, the unit 104' discriminates whether the frame being set is the first frame or not by checking the number of the perforations (P.C.L) corresponding to the number of the frames which were photographed ($S_{16}$).

When the first frame is being set, the contents of three bits of the second data memory 102' are all set as "1" ($S_{17}$).

After that, the perforation counter 103' is set for the maximum number 9 and film feeding motor is driven in the backward direction (direction toward the cartridge) ($S_{18}$). During this film feeding motion, the data corresponding to the perforation count number (i) is written on the film by controlling the light emission means 28 of three bits. That is, since the counter 103' is set for the maximum value 9 first, the unit 104' controls the unit 30 to write the data of three bits memorized in the second data memory 102' ($S_{19}$). The three bits are all "1" when the first frame is being set. When the frame other than the first frame is being set, the data is a part of the data for the preceding frame.

After the photograph is taken in the frame, when the count number of the counter 103' is the maximum value 9, the data to be written in the last writing area LED.S(n8) of FIG. 12 is transferred from the first data memory 101' to the second data memory 102' ($S_{21}$). The transferred data is written on the film at the time of feeding the next frame. Also, the counter 103' is set for "0".

If the count number of the counter 103 is not the maximum value 9, the perforations are detected immediately ($S_{22}$). The perforations are detected by the unit 27 in conjunction with the detector element 26. After the perforations are detected, the unit 104 checks whether the count number of the counter 103' is 7 or not ($S_{23}$).

If the count number is not 7, 1 is added to the count number ($S_{24}$) and the contents of the first data memory 101' corresponding to the count number of the counter 103' are written in the corresponding recording spaces between the perforations ($S_{19}$). The data is the one for the frame which is finished to be photographed and now being shifted away from the aperture position.

If the count number is 7, the perforation number 8 for one frame is added to the perforation number (P.C.L) corresponding to the used frames memorized in the memory 107' and the renewed perforation number is memorized in the memory 107' (P.C.L=P.C.L+8) ($S_{25}$).

After that, the perforation number (P.C.F) (which corresponds to the usable frame number to be photographed) counted at the time of prewinding motion when the film is loaded is compared with the perforation number (P.C.L) corresponding to the used frame number ($S_{26}$).

If P.C.F−P.C.L≦F.C is not satisfied, it means that the last frame is not yet photographed judging from the perforation number (P.C.F) counted at the time of prewinding the film. Note that F.C corresponds to the length of leading film portion. Therefore, the usable frame number F.E.X read from the cartridge 23 by the CAS code reader 31 is compared with the perforation number (P.C.L) for the used frame ($S_{27}$).

If $P.C.L \geqq 8 \times F.E.X$ is not satisfied, it means that the film has one or more usable frames being remained. Therefore, the unit 104' transmits a signal to the controller 25 to stop the film feeding motor. The unit 104' also controls the unit 30 to turn off the light emitter ($S_{28}$).

On the other hand, if $P.C.L \geqq 8 \times F.E.X$ is satisfied, it means that the last frame is finished to be photographed, which can be detected by the film end sensor 108'. In this event, the unit 104' sets the counter 103' for the maximum value 9. Also, the data for the last frame which data is remaining unrecorded in the film is written in the space LED. S(n8) of the last frame ($S_{29}$).

After that, the light emitter 28 is turned off. Also, the perforation number P.C.R.W which is counted at the time of rewinding the film is set as P.C.R.W $<$ P.C.F − P.C.L − P.C.X. In this state, the perforation number is detected ($S_{30}$, $S_{31}$). Note that P.C.X is a constant for setting the condition as P.C.R.W $<$ P.C.F − P.C.L.

However, if P.C.R.W is set as P.C.R.W = P.C.F − P.C.L in the event that P.C.L becomes larger than the genuine number due to a count error, the motor continues to rotate still after the whole of the film has been rewound back into the cartridge, since in that case the condition of count number P.C = P.C.R.W is not satisfied.

To avoid this, P.C.R.W is set for a small number and the motor is driven with the use of a timer (described later) for the time corresponding to P.C.X.

After the count number P.C becomes as P.C $\geqq$ P.C.R.W, to further rewind the film for the length corresponding to above-mentioned P.C.X plus a margine, the timer is set for "0", and unit 104 starts to count the time ($S_{33}$). When the timer counts a predetermined time, the unit 104 controls the unit 25 to stop the motor ($S_{35}$) and display the state of finishing the film winding motion.

In accordance with the above-mentioned embodiment, film winding motion is ended on the double basis of the usable frame number counted at the time of prewinding the film and the usable frame number detected from the CAS code for the sake of increasing the reliability. However, it is possible to end the film winding motion on the basis of one of the usable frame number counted at the time of prewinding the film and that detected from the CAS code.

Also, if the film is to be rewound before the last frame was photographed, the rewind button 5 is pushed, which is detected by the detector element 109' ($S_{10}$). Upon receipt of the detection signal from the element 109', the unit 104' actuates the unit 105' to output a signal for starting the film rewinding motion so that the motor starts the reverse rotation to rewind the film back into the cartridge ($S_{37}$). Also, the unit 104' controls the unit 25 to rewind the film in the same manner as mentioned above into the cartridge after the unrecorded data for the last frame is written in the film.

As mentioned above, in accordance with the embodiment of the present invention, it becomes possible to reliably rewind the film after the information data for the last frame is certainly written in the space between the perforations of the film after all the frames are used to be photographed or at the time when the manual rewind button is pushed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A trimming information recordable camera which is usable in cooperation with a labo-system in which a film is printed according to said trimming information written in said film when loaded in said camera, said camera comprising:
    a photographing lens having a plurality of focal lengths and being capable of selecting one of said focal lengths;
    a zoom finder through which a view field angle can be continuously changed; and
    a writing means for writing said trimming information in said film,
said film being able to be printed in accordance with said trimming information which is obtained from a information of said view field angle of said zoom finder and a information of a view field angle of said photographing lens.

2. A trimming information recordable camera according to claim 1. wherein said photographing lens is composed of a first lens group and a second lens group arranged in such a way that the focal length of the photographing lens is changed by putting said second lens group on the optical axis of said first lens group and taking said second lens group away from the optical axis and that the focusing of the photographing lens is carried out by operating said first lens group along said optical axis thereof.

3. A trimming information recordable camera according to claim 1, wherein the field angle of the photograph is determined in such a way that the finder view field angle is changed while the focal length of the photographing lens is being fixed so that the trimming information is obtained from the finder field angle information.

4. A trimming information recordable camera according to claim 3, wherein said trimming information is written in spaces between perforations of the film.

5. A trimming information recordable camera according to claim 1, wherein a finder zoom motor is driven in such a way that trimming point signals are generated so that the motor is kept moving until it comes to a trimming point even if a zoom button is released when the motor is positioned between the trimming points.

6. A trimming information recordable camera according to claim 1, wherein the focal length of the photographing lens is changed if necessary after a zoom button is released.

7. A trimming information recordable camera which is usable in cooperation with a labo-system in which a film is printed according to said trimming information written in said film when loaded in said camera, said camera comprising:
    a first zoom direction input means for generating a signal to change a finder field angle into a wider-angle;
    a second zoom direction input means for generating a signal to change said finder field angle into a tele-photographing-angle;

a finder zoom drive means for changing said finder field angle in accordance with said signal from said first or said second zoom direction input means; and a trimming point detection means for discriminating a step of trimming magnification to which said finder field angle corresponds from a plurality of steps of trimming magnification, said camera enabling the finder zoom motion to stop at a view field angle corresponding to the trimming magnification at the labo-system.

8. A trimming information recordable camera which is usable in cooperation with a labo-system in which a film is printed according to said trimming information written in said film when loaded in said camera, said camera comprising:

a finder view field angle information detection means for detecting information about an actual finder view field angle;

a distance measurement means for measuring the distance from the camera to a object to be photographed;

a lens group operating means for operating a first lens group of a photographing lens system, which group being moved along an optical axis thereof in either cases when the focal length is to be changed and when the focusing of said photographing lens system is to be carried out;

a focal length detection means for detecting an actual focal length of said photographing lens system;

a focal length change necessity discrimination means for discriminating whether it is necessary to change the focal length of said photographing lens system or not by comparing an information data output from said finder view field angle information detection means and an information data output from said focal length detection means;

a lens group motion control means for calculating a operating amount of said first lens group and controlling said lens group operating means on the basis of a signal output from said focal length change necessity discrimination means and an information data output from said distance measurement means; and a photodetector switch for starting a series of sequence.

9. A trimming information recordable camera which is usable in cooperation with a labo-system in which a film is printed according to said trimming information written in said film when loaded in said camera, said camera comprising:

a first zoom direction input means for generating a signal to change a finder field angle into a wider-angle;

a second zoom direction input means for generating a signal to change said finder field angle into a tele-photographing-angle;

a finder zoom drive means for changing said finder field angle in accordance with said signal from said first or said second zoom direction input means;

a finder field angle information detection means for detecting actual information about said finder field angle;

a focal length changing means for changing the focal length of a photographing lens system step by step;

a focal length detection means for detecting an actual focal length of said photographing lens system; and a focal point change necessity discrimination means for discriminating whether it is necessary to change the focal length of said photographing lens system or not by comparing an information data output from said finder field angle information detection means and an information data output from said focal length detection means.

10. A trimming information recordable camera according to claim 9, wherein the camera further comprises:

a focal length change control means for driving and controlling said focal length changing means, when said first or second zoom direction input means is changed from a state of "ON" to a state of "OFF" and said focal point change necessity discrimination means discriminates that it is necessary to change the focal length of said photographing lens system.

11. A trimming information recordable camera according to claim 9 or 10, wherein the camera further comprises:

a timer means which starts when said first or second zoom direction input means is changed from a state of "ON" to a state of "OFF"; and a focal length change control means for driving and controlling said focal length changing means when said first or second zoom direction input means becomes "ON" again within a predetermined period after said timer means has started and in the event where said focal point change necessity discrimination means discriminates that it is necessary to change the focal length of said photographing lens system.

* * * * *